(12) United States Patent
Hoskins et al.

(10) Patent No.: US 6,862,151 B2
(45) Date of Patent: Mar. 1, 2005

(54) METHOD AND APPARATUS FOR READ ERROR RECOVERY

(75) Inventors: Edward S. Hoskins, Longmont, CO (US); Robert W. Warren, Loveland, CO (US); Steven S. Williams, Longmont, CO (US)

(73) Assignee: Seagate Technologies LLC, Shakopee, MN (US)

( * ) Notice: Subject to any disclaimer, the term of this patent is extended or adjusted under 35 U.S.C. 154(b) by 222 days.

(21) Appl. No.: 09/896,782

(22) Filed: Jun. 28, 2001

(65) Prior Publication Data

US 2002/0057510 A1 May 16, 2002

Related U.S. Application Data

(60) Provisional application No. 60/249,005, filed on Nov. 15, 2000.

(51) Int. Cl.⁷ ................................................ G11B 5/09
(52) U.S. Cl. ............................ 360/53; 360/69; 360/31
(58) Field of Search .......................... 369/59.19, 53.13; 360/53; 714/55

(56) References Cited

U.S. PATENT DOCUMENTS

| | | | |
|---|---|---|---|
| 4,412,285 A | 10/1983 | Neches et al. | 364/200 |
| 4,637,023 A | 1/1987 | Lounsbury et al. | 371/38 |
| 4,910,667 A | 3/1990 | Tanaka et al. | 364/200 |
| 4,914,529 A | 4/1990 | Bonke | 360/48 |
| 5,012,459 A | 4/1991 | Odaka et al. | 360/32 |
| 5,034,914 A | 7/1991 | Osterlund | 364/900 |
| 5,075,804 A | 12/1991 | Deyring | 360/49 |
| 5,179,530 A | 1/1993 | Genusov et al. | 364/726 |
| 5,210,851 A | 5/1993 | Kato et al. | 395/425 |
| 5,276,662 A | 1/1994 | Shaver et al. | 369/32 |
| 5,287,363 A * | 2/1994 | Wolf et al. | 360/53 |
| 5,454,098 A | 9/1995 | Pisello et al. | 395/500 |
| 5,530,705 A | 6/1996 | Malone | 371/5.1 |
| 5,594,926 A | 1/1997 | Chang et al. | 395/872 |
| 5,627,843 A | 5/1997 | Deng et al. | 371/37.1 |
| 5,636,188 A | 6/1997 | Funahashi | 369/32 |
| 5,689,653 A | 11/1997 | Karp et al. | 395/250 |
| 5,721,543 A | 2/1998 | Johnson et al. | 341/50 |
| 5,721,816 A | 2/1998 | Kusbel et al. | 395/182.13 |
| 5,765,193 A | 6/1998 | Rosich et al. | 711/136 |
| 5,808,994 A * | 9/1998 | Tanaka et al. | 369/59.19 |
| 5,835,930 A | 11/1998 | Dobbek | 711/4 |
| 5,844,911 A | 12/1998 | Schadegg et al. | 371/10.2 |
| 5,848,438 A | 12/1998 | Nemazie et al. | 711/201 |
| 5,890,209 A * | 3/1999 | Dobbek | 360/78.04 |
| 5,937,435 A | 8/1999 | Dobbek et al. | 711/202 |

(List continued on next page.)

OTHER PUBLICATIONS

Method, System and Interface for Mapping Tracks in No–ID Disk Drives, IBM TDB vol. 38, No. 12, Dec. 1995, pp 275–277.

Automated Hardware Processing of Direct Access Storage Device Skip Masks, IBM TDB vol. 239, No. 05, May 1996, pp. 121–122.

Skip Mask Operation in a No–ID Disk Drive, IBM TDB vol. 39, No. 06, Jun. 1996, pp. 47 –50.

*Primary Examiner*—Sinh Tran
*Assistant Examiner*—Rocio Colon
(74) *Attorney, Agent, or Firm*—Fish & Richardson P.C., P.A.

(57) ABSTRACT

A procedure for reading data stored on a data storage disc in a disc drive is disclosed. The procedure involves reading data from one or more sectors on the data storage disc after an error occurred while initially reading the sector(s) pursuant to a read command issued by a host computer. During the initial read, the procedure logs information pertaining to the sector(s) on the disc where an error occurred. The logged information is then used during the procedure to retrieve data from the sector(s) in a single revolution of the disc. The procedure uses a skip mask, a vector buffer management list and a data throttling mechanism to administer a transfer of data from a disc to a host computer via a data buffer.

41 Claims, 13 Drawing Sheets

U.S. PATENT DOCUMENTS

| | | | |
|---|---|---|---|
| 5,983,309 A | 11/1999 | Atsatt et al. | 711/4 |
| 6,025,966 A | 2/2000 | Nemazie et al. | 360/53 |
| 6,043,943 A | 3/2000 | Rezzi et al. | 360/46 |
| 6,043,946 A | 3/2000 | Genheimer et al. | 360/53 |
| 6,049,439 A | 4/2000 | Ono et al. | 360/53 |
| 6,061,805 A | 5/2000 | Suzuki et al. | 714/2 |
| 6,088,183 A | 7/2000 | Nelson | 360/75 |
| 6,118,608 A | 9/2000 | Kakihara et al. | 360/53 |
| 6,122,121 A | 9/2000 | Keeler et al. | 360/51 |
| 6,493,165 B1 * | 12/2002 | Satoh et al. | 360/65 |
| 6,523,142 B1 * | 2/2003 | Igari et al. | 714/55 |
| 2001/0010605 A1 * | 8/2001 | Aoki | 360/53 |
| 2002/0054555 A1 * | 5/2002 | Karakawa et al. | 369/53.33 |

* cited by examiner

METHOD AND APPARATUS FOR READ ERROR RECOVERY

RELATED APPLICATIONS

This application claims priority of U.S. provisional application Ser. No. 60/249,005, filed Nov. 15, 2000.

FIELD OF THE INVENTION

The present invention relates generally to a disc drive and more specifically to a method of read error recovery in a disc drive.

BACKGROUND OF THE INVENTION

In a disc drive, data are stored on one or more discs coated with a magnetizable medium. Data are written to the discs by an array of transducers, typically referred to as read/write heads, mounted to a radial actuator for movement of the heads relative to the discs. The data are stored on a plurality of concentric circular tracks on the discs until such time that the data are read from the discs by the read/write heads. Each of the concentric tracks is generally divided into a plurality of separately addressable data sectors. The transducers are used to transfer data between a desired track and an external environment, which includes, among many components, a host computer.

During a write operation, data are written onto the disc track. Once data are written to the disc, each sector holds a block of data, which is the absolute smallest quantity that can be written to the disc during a single write operation. Adjacent blocks, commonly referred to as data segments are typically written to the disc during a single write operation referred to as a command. Critical to both of these operations—reading and writing—is the accurate locating of a transducer over the center of the desired track. During a read operation a transducer senses the data previously written on the track and transfers the data to the external environment.

In general, there are two types of data stored on disc drives, normal computer data and audio/visual data. Audio/visual data relates to computer readable information stored on disc drives wherein the data corresponds to information that produces audio signals and/or visual signals. These audio and visual signals are used by a computer host to translate them into audio and video presentations through either a speaker or a monitor. Normal computer data is considered to be "reliability critical" wherein correct data storage and retrieval is much more important than any loss in time associated with achieving such reliability. In contrast, audio/visual data is considered to be time, or performance, critical. If some of the audio/visual data is corrupt and unreadable, typically the presentation to the user is not seriously affected. Often such a loss in data may present only a flicker in the audio or video signal to the user or otherwise be undetectable. However, if the information is presented with many pauses or skips due to losses in time associated with trying to insure data reliability, the resulting presentation to the user is unsatisfactory.

The transfer of files between a disc and a host computer is controlled in a multi-level setting characterized by a bi-level transfer scheme. At a macroscopic level, track sectors are selected that contain the data sectors of which the file is divided. More specifically, and in a microscopic sense, cells along a track are magnetized to correspond to the bit structure of the file for the purposes of subsequent reading. A disc drive typically includes a buffer to implement this bi-level transfer scheme. The purpose of the buffer is to accept the sectors of data during its transfer between the host computer and the disc and then transfer the data to the proper component—either the host computer or the disc.

When a disc drive is manufactured, it will typically contain a number of defects due to process imperfections and impurities or irregularities on the surface of the disc. These defects typically result in "hard" errors during read operations thereby rendering the defective areas of the disc permanently unusable. Hard errors are errors encountered during read operations that are permanent in nature in that the defective sector is permanently unable to participate in either form of data transfer—reading or writing. As such, methods are employed to "map out" the defects on the discs. Typically, a newly manufactured disc drive will be tested to determine which sectors of the discs are defective. The sector numbers of these defective sectors are then compiled into a primary defect list that is then stored, typically on a reserved area of the disc.

In addition to the primary defects that are addressed during the manufacture of the disc drive, there are also "grown defects" which occur during the operational life of the disc drive. "Grown defects," also result in "hard errors" during read operations and are therefore permanent in nature. As with primary defects, a list of "grown" defects, sometimes called a secondary or grown list, is also maintained and stored in a reserved space on the disc. When the disc drive is powered on, typically the primary and secondary lists are read from the disk and stored in some form of random access disk drive memory. The system controller then uses the information from the primary and secondary lists to manage the defects and avoid writing data to defective sectors.

In addition to various forms of "hard errors" described above, disc drives may contain "soft errors" that further hinder disc drive performance. Soft errors are non-permanent in nature and may only occur during a single revolution of the disc. For instance, when accessing a file pursuant to a read command, a "soft error" may occur thereby rendering a particular sector of the file is inaccessible. However, that sector may be accessible to subsequent read commands or upon subsequent revolutions initiated during a read error recovery procedure of the present read command. "Soft errors" are sometimes caused by electrical phenomena surrounding the disc. "Soft errors" may also be caused by disc vibration or shock.

One method commonly used for managing defective sectors in a disc drive involves mapping each defective sector on the disc to a corresponding good substitute sector located elsewhere on the disc. However, this "mapping" technique is only useful if the error is a "hard error." Indeed, if the error located on a sector is a "soft error," mapping to a substitute sector would permanently render that sector useless even though the sector may be non-defective and accessible to subsequent read commands. Conventional methods employing read error recovery procedures immediately suspend the read operation when a "soft error" is encountered. Following a complete revolution of the disc, the sector having the "soft error" is positioned under the read/write head and the disc drive retries the read operation at the previously defective sector. Again, if the soft error is still present, conventional methods repeat the suspension and retry process until the read operation is successful. Once recovery is successful, the read command is executed until either another "soft error" is encountered or the end of the file being read is reached.

Conventional disc drives are typically not associated with more than one "soft error" per track. However, the potential for multiple errors on a track increases as the demand for disc drive use in an audio/visual environment increases. With respect to audio/visual data, a budgeted amount of time is reserved for read error recovery procedures due to the time-critical nature of such data. Because conventional "soft" read error recovery procedures are performed serially, ie, recoveries of defective sectors are performed one sector at a time, if multiple errors are encountered on a track, multiple revolutions of the disc are administered to recover the data from the defective sector. Hence, the budget of time reserved for read error recovery procedures is quickly depleted under such circumstances. Accordingly, because of the budget, data contained on a significant amount of sectors, both defective and non-defective, may not be transferred to the host as requested by the read command.

SUMMARY OF THE INVENTION

In accordance with the present invention, the above and other problems are solved by a read error recovery procedure accessing multiple sectors of a data segment where a soft error occurred during an initial access of the data segment pursuant to a read command. The read error recovery procedure allows a disc drive during a single revolution to reread data from each sector on which a soft error was encountered. If a soft error occurs during the read error recovery procedure, the procedure logs error information into various components of the disc drive so that data stored on the sectors where the errors occurred may be re-read during a subsequent read error recovery procedure.

The read error recovery procedure may be initiated following either the conclusion of an initial access of a data segment being read pursuant to a read command or the conclusion of a read error recovery access administered to re-read data of the data segment. The read error recovery procedure is implemented using a data throttling mechanism, a buffer manager and a skip mask hardware. The data throttling mechanism prevents overrun and underrun conditions on a buffer receiving the data retrieved from the disc media as the disc and host add and remove data blocks from the buffer. The buffer manager builds a single linked list of next buffer locations to use once the current buffer location is filled. During the read error recovery procedure, the buffer manager directs a disc address pointer to transfer data only to the buffer sectors associated with the sectors of the data segment on which a soft error was encountered during the previous access of the data segment.

The skip mask hardware builds a transfer/don't transfer register having an entry associated with each sector of the data segment being read pursuant to the read command. Initially, the register of the skip mask hardware is set so that each entry instructs a disc formatter to enable a transfer of data from the disc media to a buffer. If, during the initial access, a soft error is encountered while reading data from a sector, the skip mask hardware updates the entry in the register such that the disc formatter is instructed to enable a transfer of data from the sector during the first read error recovery procedure. As such, during the first read error recovery procedure, if data from a sector is properly retrieved during the re-read, the skip mask hardware updates the entry in the register such that the disc formatter is instructed not to enable the transfer of data from the sector during subsequent read error recovery procedures. However, if data is not properly retrieved from the sector, the entry in the register is not updated thereby enabling the sector to be re-read during the subsequent read error recovery procedures until data stored on the sector is properly retrieved.

These and various other features as well as advantages, which characterize the present invention, will be apparent from a reading of the following detailed description and a review of the associated drawings.

DETAILED DESCRIPTION

Figure 1:
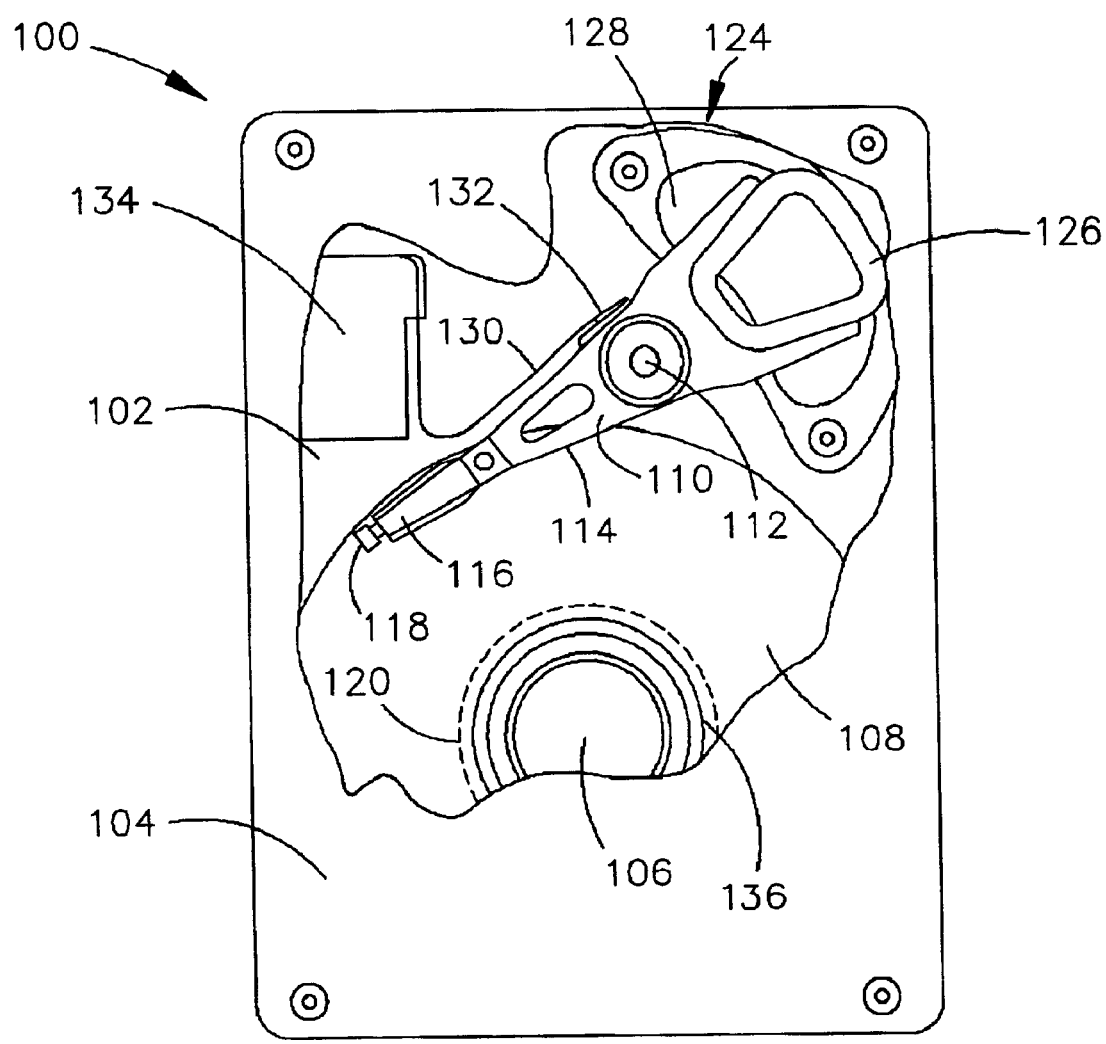
FIG. 1 is a plan view of a disc drive incorporating a preferred embodiment of the present invention showing the primary internal components.

The present invention and its various embodiments are described in detail below with reference to the figures. When referring to the figures, like structures and elements shown throughout are indicated with like reference numerals.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106 which rotates one or more discs 108 at a constant high speed. Information is written to and read from tracks 306 (FIG. 3) on the discs 108 through the use of an actuator assembly 110, which rotates about a bearing shaft assembly 112 positioned adjacent to the discs 108. The actuator assembly 110 includes a plurality of actuator arms 114 which extend towards the discs 108, with one or more flexures 116 extending from each of the actuator arms 114. Mounted at the distal end of each of the flexures 116 is a read/write head 118 which includes an air bearing slider enabling the read/write head 118 to fly in close proximity above the corresponding surface of the associated disc 108.

The spindle motor 116 is typically de-energized when the disc drive 100 is not in use for extended periods of time. The read/write heads 118 are moved over park zones 120 near the inner diameter of the discs 108 when the drive motor is de-energized. The read/write heads 118 are secured over the park zones 120 through the use of an actuator latch arrangement, which prevents inadvertent rotation of the actuator assembly 110 when the heads 118 are parked.

The radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
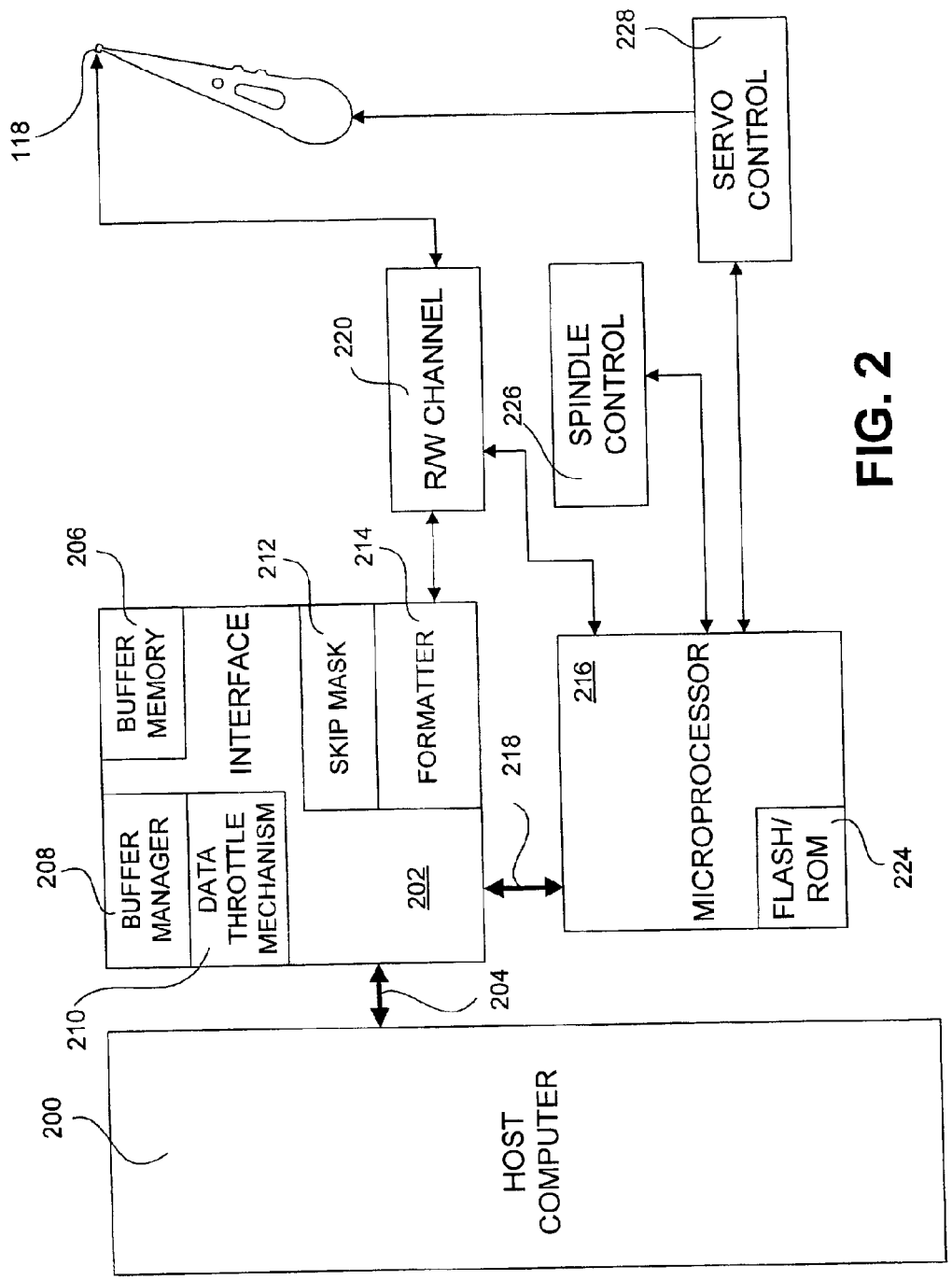
FIG. 2 is a functional block diagram generally showing the main functional components used to control the disc drive of FIG. 1 including a data throttling mechanism, a skip mask hardware and a buffer manager.

Referring now to FIG. 2, shown therein is a functional block diagram of the disc drive 100 of FIG. 1, generally showing the main functional circuits which are preferably resident on a disc drive printed circuit board and which are used to control the operation of the disc drive 100. As shown in FIG. 2, the host computer 200 is operably connected to an interface application specific integrated circuit (interface) 202 via various control and data lines 204

The interface 202 preferably includes an associated buffer memory 206 which facilitates high-speed data transfer between the host computer 200 and the disc drive 100 Additionally, the interface 202 preferably includes a buffer manager 208, a data throttling mechanism 210, a skip mask 212, and a formatter 214, which together, facilitate the orderly flow of data to and from the disc drive 100. It should be understood that any or all of the buffer memory 206, buffer manager 208, data throttling mechanism 210, skip mask 212, and/or formatter 214, may be located outside of the interface 202. Various configurations of these elements within the disc drive 100 may be employed without departing from the scope of the invention.

As also shown in FIG. 2, a microprocessor 216 is operably connected to the interface 202 via various control and data lines. The microprocessor 216 provides top level communication and control for the disc drive 100 in conjunction with programming for the microprocessor 216 which is typically stored in a microprocessor memory (MEM) 224 The MEM 224 may include random access memory (RAM), read only memory (ROM) and other sources of resident memory for the microprocessor 216. Additionally, the microprocessor 216 provides control signals for spindle control 226, and servo control 228.

Figure 3:
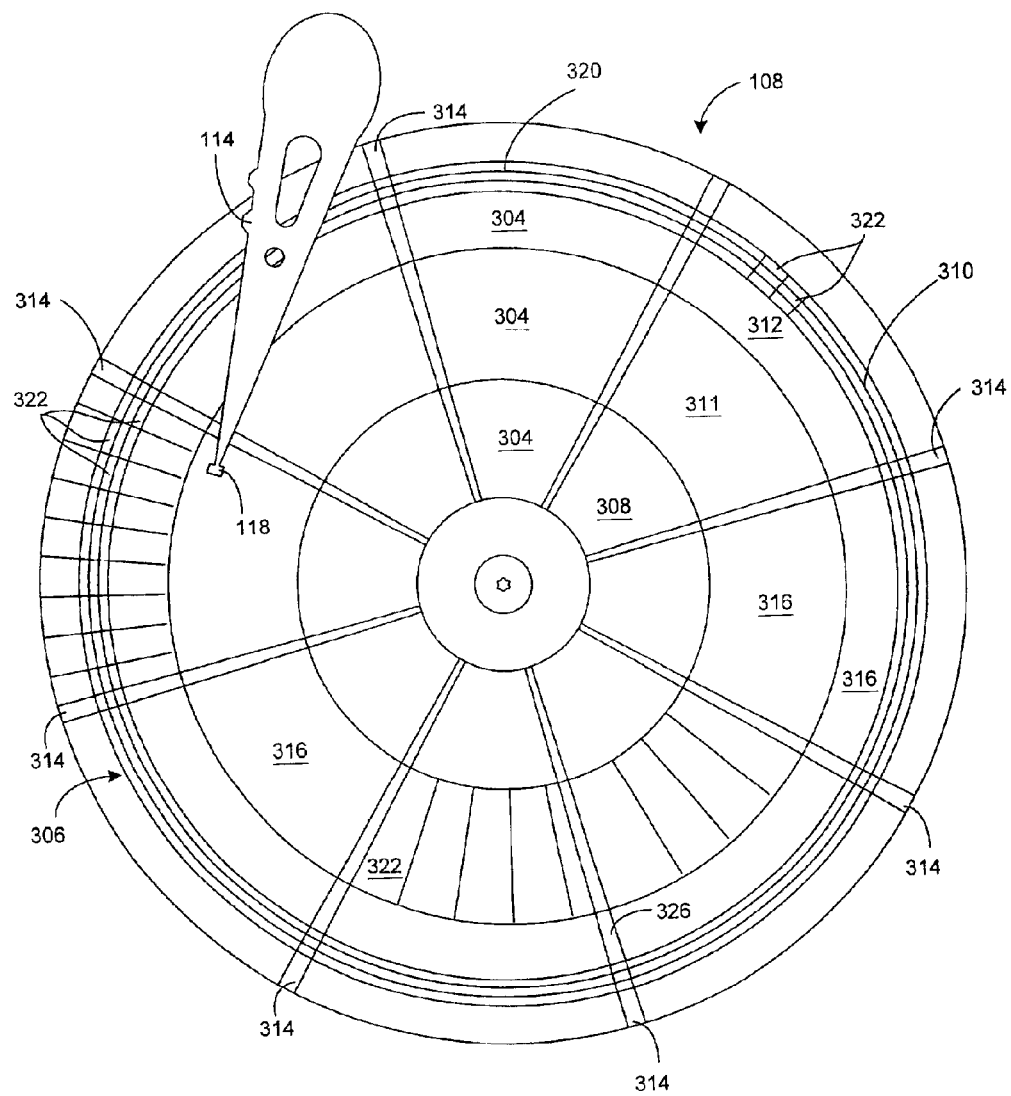
FIG. 3 is a plan view of a disc of the disc drive of FIG. 1 generally showing the main components on the surface of the disc.

FIG. 3 shows the logical recording structure of an exemplary disc 108 of the disc drive 100. The disc 108 is divided into several concentric disc zones 304 which contain regions of adjacent tracks 306. For example, the magnetic disc 108 of FIG. 3 includes an inner zone 308, a center zone 311, and an outer zone 312. When configured with servo burst sectors 314, each disc track 306 is divided into slices called data wedges 316. The burst sectors 314 include data for maintaining accurate positioning of the disc head 118 and are positioned in predetermined locations along the disc 108. As the disc 108 rotates, the data head 118 reads the servo information containing an address within the servo bursts 314 and sends the servo information back to the servo system. The servo system checks whether the address in the servo information read from the burst sectors 314 corresponds to the desired head location. If the address does not correspond to the desired head location, the actuator arm 114 is adjusted until the head 118 is moved to the correct track location.

Each track 306 includes discrete data sectors 322 containing stored user information. The number of data sectors 322 contained in a particular track 306 depends, in part, on the length (i.e. circumference) of the track 306. Therefore, tracks 306 located at the outer zone 312 typically contain more data sectors 322 per data wedge 316 than tracks 306 located at the center zone 311. Similarly, tracks 306 located at the center zone 311 typically contain more data sectors 322 per data wedge 316 than tracks 306 located at the inner zone 308. Besides containing user information, each data sector 322 also may include other data to help identify and process the user information. As noted above, tracks 306 may also contain one or more permanently defective sectors 322 that cannot be reliably written to or read from by the disc drive 100 circuitry. For this reason, a number of alternate sectors are provided in one or more alternate tracks 320 to which data that is intended to be written in these defective sectors can be revectored.

Referring back to FIG. 2, data to be written to the disc drive 100 are passed from the host computer 200 to the buffer 206 and then on to a read/write channel 220, which encodes and serializes the data and provides the requisite write current signals to the heads 118 such that the data is written to the appropriate sectors 322 of the disc 108. To retrieve data that has been previously stored in the sectors 322 on the disc 108, the heads 118 are passed over the disc sectors 322 and read signals are generated by the heads 118 which are provided to the read/write channel 220. The interface 202 performs read signal decoding, error detection, and error correction operations. The interface 202 then outputs the retrieved data to the buffer 206 for subsequent transfer to the host computer 200.

As is typically, the buffer 206 includes a number of individual buffer sectors into which data from the discs 108 and/or the host computer 200 are temporarily stored while awaiting transfer to or from the discs 108 or the host computer 200. Each of the buffer sectors in the buffer 206 has a unique address within the buffer 206 which may be used by the buffer manager 208 for directing the transfer of data to and from the buffer sectors. Preferably, the data is stored in the buffer 206 in consecutive buffer sector addresses. Also, preferably, data from the host 200 or disc 108, which is stored in the buffer 206 is stored in the buffer sectors in the same sequential order as that data was stored on the disc 108 or in the host 200.

Figure 4:
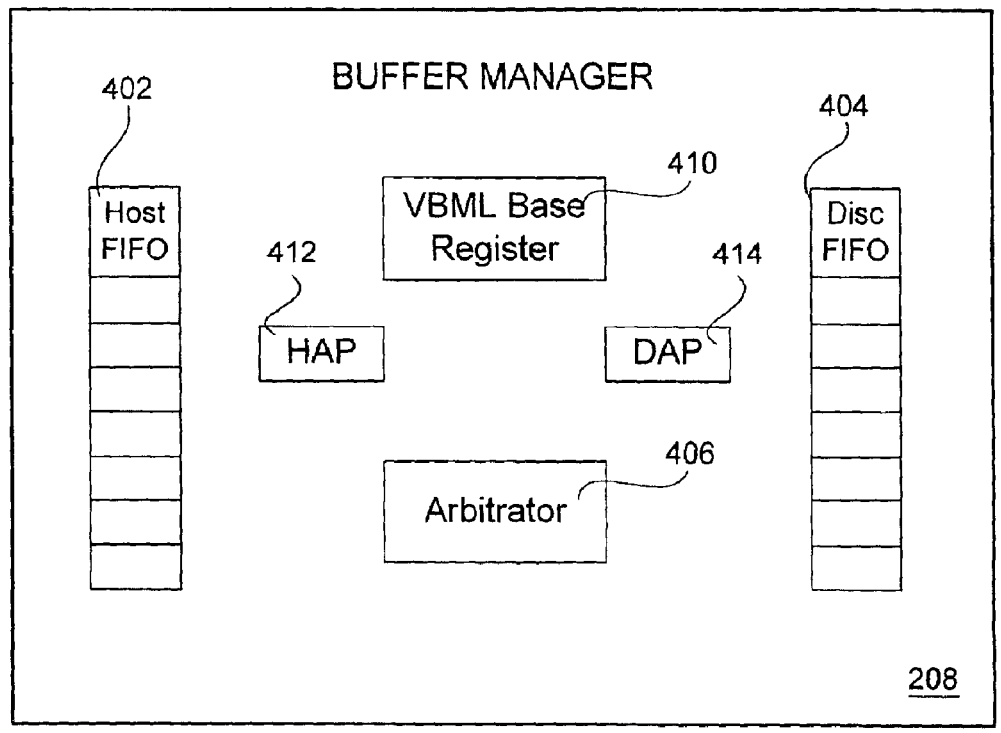
FIG. 4 illustrates various component parts of the buffer manager shown in FIG. 2.
Figure 4:
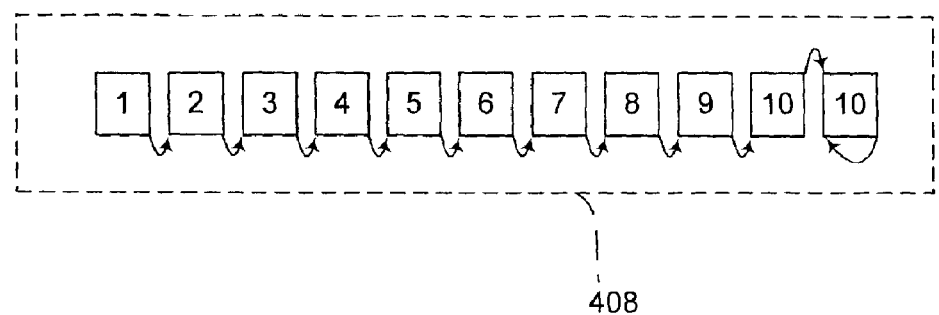

In general, the buffer manager 208 controls or manages the flow of data into and out of the buffer memory 206. Referring now to FIG. 4, the buffer manager 208 includes, among other things, a host first-in-first-out queue (FIFO) 402 for temporarily storing data transferred between the host computer 200 and the buffer 206, a disc FIFO 404 for temporarily storing data transferred between the disc 108 and the buffer 206, and an arbitrator 406 for controlling the transfer of data into and through the FIFOs to the buffer 206. Additionally, as shown in FIG. 4, the buffer manager 208 includes, a VBML base register 410, a disc address pointer register (DAP) 414, and a host address pointer register (HAP) 412. The buffer manager 208 also preferably maintains a vector buffer manager list (VBML) 408 within the buffer 206, as described in more detail below.

The DAP 414 and the HAP 412 are used by the buffer manager 208 to indicate where in the buffer 206 data is placed during a read or write operation. The HAP 412 indicates or points to the buffer sector where data which is incoming from the host computer 200 is to be placed, 2 conversely the buffer sector from which data which is outgoing to the host computer 200 is to be extracted. Similarly, the DAP 414 indicates or points to the buffer sector where data which is incoming from the disc 108 is to be placed, or conversely the buffer sector where data which is outgoing to the disc 108 is to be extracted. For example, when the host 200 accesses the buffer 206, such as when data is being written to the buffer 206 for transmission to the disc 108, the HAP 412 and DAP 414 will initially be set to the same buffer sector. As each buffer sector is filled with data during a given write, the DAP 414 will point to the next buffer sector which is to be written. As described in greater detail below, as data is coming in from the host 414, the next buffer sector to be written with data will be indicated by the VBML 408. During this write of data from the buffer 206 to the host 200, the DAP 414 will continue to point to the first buffer sector written during the write. As such, after the write has been completed and all of the intended data has been written to the appropriate buffer sectors, the HAP 412 will be pointing to the last buffer sector written during the write request and the DAP 414 will be pointing to the first buffer sector written during the write request. When the data written during the write request is consequently transferred from the buffer 206 to the disc 108, the DAP 414 will then indicate the first buffer sector containing data to be transferred to the disc 108. As with the initial write of the data to the buffer 206, the next buffer sector containing data to be transferred to the disc 108 will be indicated by the VBML 408. Buffer sectors will continue to be read, under the direction of the VBML 408, until all of the intended data has been transferred from the buffer 206 to the disc 108.

As shown in FIG. 4, the VBML 408 preferably comprises a singly-linked list of next buffer sector locations. That is, the VBML 408 indicates the order and location of buffer sectors to be accessed during an access request. A new VBML 408 is typically, but not always, constructed for each new access request. The VBML base register 410 contains a pointer indicating the address of the first buffer sector in the user data region of the buffer 206. The VBML base register 410 is preferably set once at power up of the disc drive 100. The locations expressed in the VBML 408 are then determined and indicated relative to the VBML base register 410. The length of the VMBL 408 is variable and dependent on the length of the data being transferred in a given read or write request as well as the size of the buffer 408. Through manipulation of the VBML, the order in which buffer sectors in the buffer are written and read can be controlled.

Referring back to FIG. 2, the disc drive 100 includes a data throttling mechanism 210. The data throttling mechanism 210 is employed in the disc drive 100 to prevent over-run and under-run conditions in the buffer 206. For example, when data is written from the host 200 to the disc 108, the data throttling mechanism 210 keeps track of the number of buffer sectors written to in the buffer 206. As the buffer sectors are being written to the buffer 206 from the host 200, data within the buffer is typically virtually simultaneously being extracted from the buffer for delivery to the disc 108. To keep track of the incoming and outgoing data, so as to prevent over-run and under-run conditions in the buffer 206, the data throttling mechanism 210 employs, among other things, a host counter and a disc counter. As each new sector of data is being written to the buffer 206 from the host 200, the host counter is updated. Similarly, as each sector of data is read from the buffer 206 the disc counter is updated. Based on these counters, among other things, the data throttling mechanism 210 either stops the flow of data into the buffer 206 or the flow of data out of the buffer 206 so that buffer over-run and/or buffer under-run conditions do not occur. It will be understood that other various details of construction of the data throttling mechanism 210 are not included herein, as data throttling mechanisms are well known to those skilled in the art and such details are unnecessary for the purpose of describing the present invention.

As shown in FIG. 2, the interface 202 also preferably includes a formatter 214. The formatter 214 keeps track of the location on the disc 108 of the servo burst sectors 314 and the data sectors 322. The formatter 214 is preferably located along a communications path between the disc FIFO 404 of the buffer manager 208 and the disc 108 The formatter 214 regulates the flow of data between the buffer manager 208, and thus the buffer 206, and the disc 108 such that the data which are being sent to the disc 108 from the buffer manager 208 are properly written to the appropriate sectors 322 on the disc and so that servo burst sectors 314 are not mistakenly written to. Disc drive formatters of the type described are well known to those skilled in the art and, therefore, a detailed description of the formatter is not provided here.

As further shown in FIG. 2, the interface 202 also preferably includes a skip mask 212. In general, the skip mask 212 is operably connected to the formatter 214 and provides memory storage, such as registers, which contain transfer and don't transfer information for each sector of information which is passing through the formatter 214. For example, a series of registers in the skip mask 212 may contain either binary ones or zeros, wherein a "1" indicates that a data sector should not be allowed to pass through the formatter and a "0" indicates that a data sector should be allowed to pass through the formatter 214. As such, as a read or write to a particular track 306 is being carried out, the values in the skip mask registers will indicate which of the sectors in the transfer should and should not be allowed to pass through the formatter 214. Thus, the formatter 214 may skip selected sectors in an otherwise contiguous read or write operation during a single read or write operation or revolution of the disc 108. As such, the skip mask 212 allows the formatter 214 to disable, or skip, reading data from sectors on the disc 108 during an access without slipping revolutions. As such, the skip mask 212 is responsible for specifying whether data is to be read from each sector as each sector is accessed, or detected, by the read/write head 118.

Figure 5:
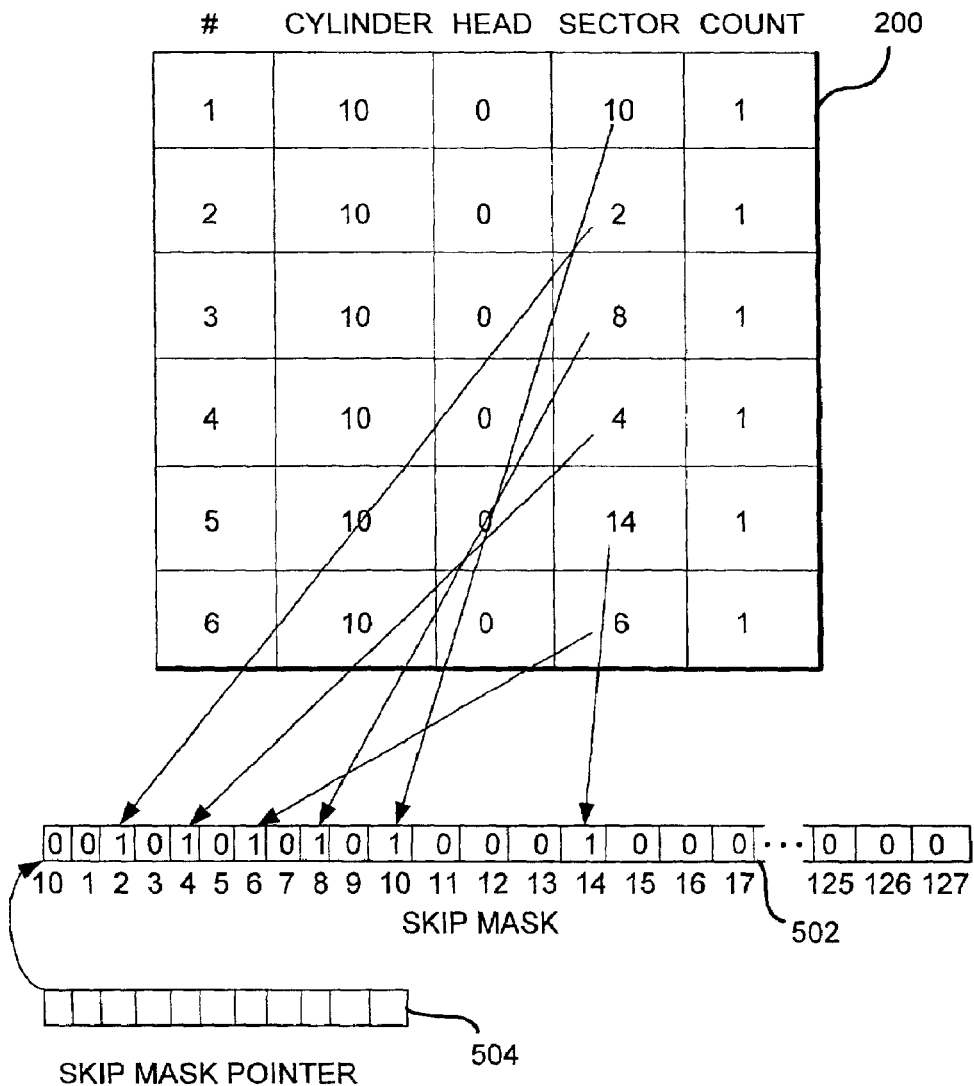
FIG. 5 is a diagram representing a set of host commands and how they map into skip mask hardware shown in FIG. 2.

FIG. 5 illustrates how an incoming set of host commands corresponds to and is used by the disc drive firmware to build a transfer/no-transfer list 502 in the skip mask hardware 212. The exemplary host commands table 500 illustrates 6 commands sent to the disc drive 100 from the host computer 200 in the order of the command number (#). Each command in this example specifies accessing disc data on the same track (Cylinder 10, Head 0). The commands also specify accessing data sectors in the order 10-2-8-4-14-6. Each command is either requesting or sending a count of 1, or in other words, 1 sector of data. The skip mask table, or instruction list, 502 is a representation of the skip mask hardware 212. The skip mask 212 may be any type of holding hardware which permits loading and bit-wise reading. In a preferred embodiment as illustrated in FIG. 2, the skip mask hardware 212 is 128 bits. Preferably, the skip mask hardware 212 is a register consisting of a bank of eight 16-bit registers that are linked to form one large 128-bit register. A skip mask pointer 504 is used to point to the first bit in the skip mask table 502 to be used during the next sector transfer operation.

Figure 6:
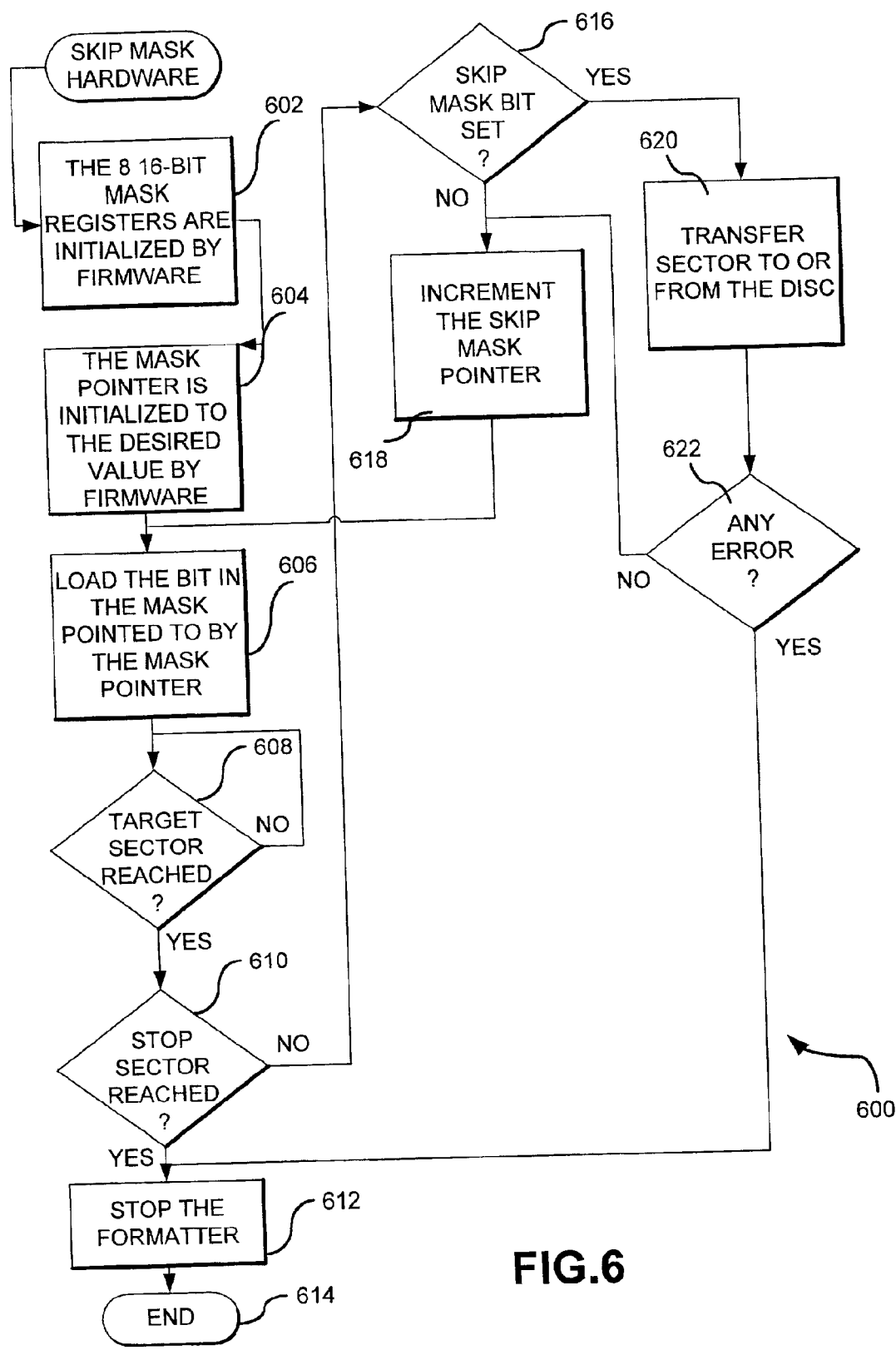
FIG. 6 is a skip mask hardware flowchart illustrating the skip mask mechanism process in accordance with a preferred embodiment of the present invention.

FIG. 6 is a flow diagram of a preferred embodiment of the operations performed by the skip mask hardware 212. The process 600 begins in load operation 602. As depicted in the diagram, as commands are received by the disc drive 100, the firmware initializes the 128-bit skip mask register. Control then transfers to initialize operation 604. Here, the skip mask pointer 504 is initialized to point to the next transfer/no-transfer bit for the next sector. Control then transfers to load operation 606 where the firmware loads the bit pointed to in the skip mask table 502. Control then transfers to query operation 608. Query operation 608 determines from the formatter 214 whether the target sector for transfer has been reached; that is, whether the exact media location is oriented under the exact read/write head 118 for transfer. If the target sector has not yet been reached the hardware continues to wait. If the target sector has been reached, control transfers to query operation 610. Query operation 610 checks to see if the stop sector has been reached. The stop sector indicates an end of transfer. If the stop sector has been reached, control transfers to halt operation 612, which halts the formatter 214. Control then transfers to terminate operation 614, and the sequence terminates. If query operation 610 determines that the stop sector has not been reached, control transfers to query operation 616. Query operation 616 interprets the skip mask bit previously loaded from the location pointed to by the skip mask pointer 504. If the bit is not set, control transfers to increment operation 618. Increment operation 618 increments the skip mask pointer 504 and control returns to load operation 606. If query operation 616 determines that the skip mask bit is set, control transfers to transfer operation 620. During transfer operation 620, the media is accessed and the data sector is transferred either to or from the disc 108. Control then transfers to query operation 622, where the transfer is checked for errors. If no errors occurred during the transfer, control returns to increment operation 618. If errors did occur during the transfer, control transfers to halt operation 612.

Figure 7:
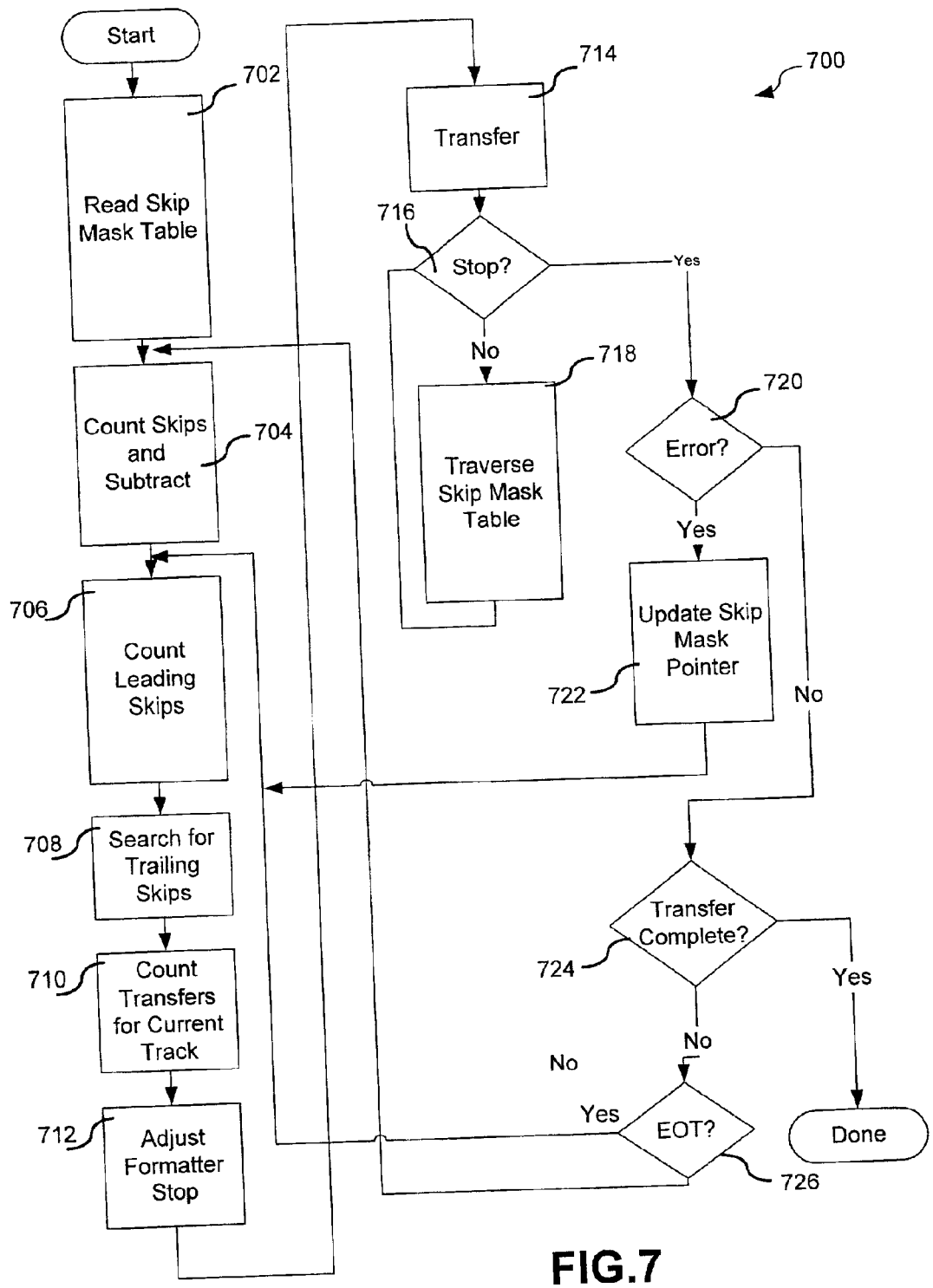
FIG. 7 is a skip mask software flowchart illustrating the skip mask software process in accordance with a preferred embodiment of the present invention.

FIG. 7 is a flow diagram of a preferred embodiment of the operations of the skip mask software. The process begins in read operation 702, where the skip mask table 502 and the number of transfers and skips in the mask and the starting LBA that were previously determined by a queue process 600 are read. Control then transfers to count operation 704 where the skips in the mask that are on the current track are counted and subtracted from the remaining skip mask count acquired in read operation 702. Control then transfers to count operation 710 where the leading skips in the mask are counted and used to adjust the starting LBA and target for the formatter 214 and both the hardware 504 and software skip mask pointers. Control then transfers to count operation 710, where the mask is searched for trailing skips and the formatter 214 stop is adjusted accordingly. Control then transfers to count operation 708, where the number of transfers for the current track are counted and the formatter 214 is set up accordingly. Control then transfers to count operation 712 where the formatter stop is adjusted for re-vectored sectors that are not skips in the transfer. Control then transfers to transfer operation 714, where the formatter 214 begins the transfer. Control then shifts to query operation 716 to determine if the formatter 214 has stopped. If the formatter 214 has not stopped, control transfers to traverse operation 718. In traverse operation 718, the skip mask table 502 is traversed equal to the number of sectors transferred since the last servo burst. The LBA is updated with the number of skips and transfers traversed, and the software skip mask pointer is adjusted. Control then transfers back to count operation 704. If query operation 716 determines that the formatter 214 has stopped, control transfers to query operation 720. If query operation 720 determines that an error has occurred during the transfer, control transfers to update operation 722, and the skip mask pointer from the last good servo burst is used to update the hardware pointer 504 and adjust the target LBA. Control then transfers back to count operation 706. If query operation 720 determines no error occurred during the transfer, control transfers to query operation 724. Query operation 724 determines if the transfer has completed. If it has, the subroutine terminates. If query operation 724 determines that the transfer operation has not completed, control transfers to query operation 726. Query operation 726 determines if the end of the track has been reached. If it has, control transfers to count operation 704. If the end of track has not been reached, control transfers to count operation 706.

Essentially, the hardware and firmware of the present invention interact as follows. As commands are received by the disc drive 100, the firmware calculates which sectors all fall on the current track 306, and constructs a skip mask table 502 accordingly. The skip mask 212 is a large 128-bit register containing transfer/no-transfer bit-wise flags for each sector on a track 306. A pointer 504 points to the first mask bit to use in the mask. Once the target sector is reached, a target calculator induces a pulse to the skip mask hardware 212. The bit in the skip mask table 502 currently pointed to by the skip mask pointer 504 is "ANDed" with the pulse generated by the target calculator. The skip mask mechanism 212 is therefore transparent to the formatter 214. The mask pointer 504 is then incremented for the next sector. On each sector pulse thereafter (except sectors that have slipped defect status or when the stop sector has been reached) the formatter 214 consults the bit in the skip mask table 502 currently pointed to, and increments the pointer accordingly. A transfer will only be affected by the skip mask 212 if the sector has good defect status or spared status. It will not be affected by the skip mask 212 if the sector has slipped defect status. If the sector has slipped status, the mask pointer 504 is not incremented and no transfer occurs.

The formatter 214 does not stop on spared defective sectors if the mask table 502 entry for that sector is zero. If the mask entry for a spared sector is set, the formatter 214 stops and does not transfer that sector. These requirements are achieved by the firmware setting the sector the formatter 214 is to stop on to the next spared sector that has its mask bit set, or to the end of the transfer, whichever occurs first. The skip mask table 502 therefore represents the physical track before skew and defect information.

Figure 8:
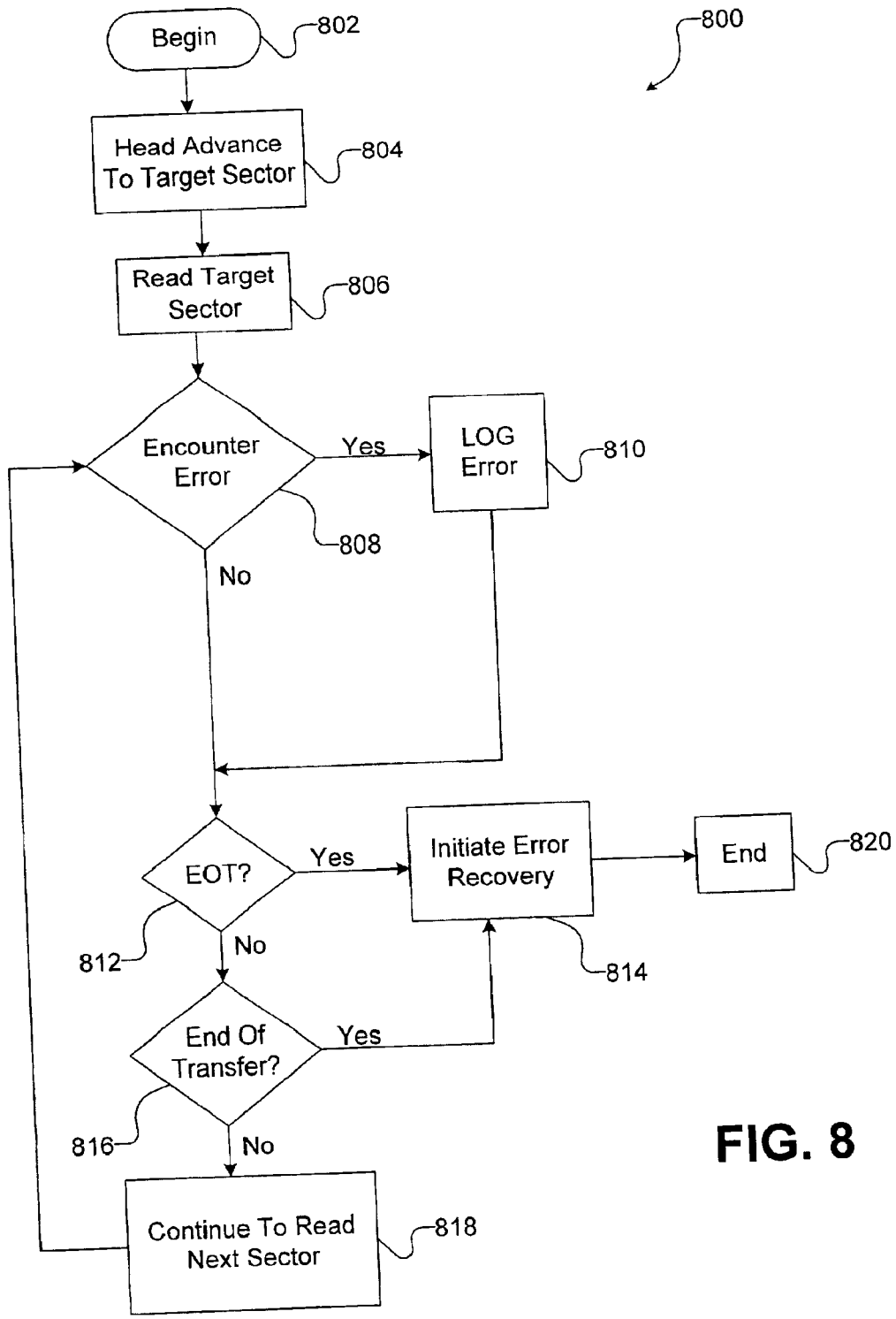
FIG. 8 is a flow diagram that illustrates operational characteristics of an initial read procedure initially reading a data segment on a selected track of the disc drive shown in FIG. 1 in accordance with an embodiment of the present invention.

FIG. 8 illustrates operations of an initial read procedure 800 in accordance with a preferred embodiment of the present invention. The initial read procedure 800 is performed as the read/write head 118 accesses, or detects, each sector of a data segment. "Accessing," as used in this specification, is to mean the retrieval of servo information associated with each sector 322 of the data segment and is distinguished from "reading" the sector 322 in that a sector 322 is "accessed" whereas the data from the sector 322 is "read." As described below, whether data from a sector 322 is read to a buffer 206 is determined by a skip mask table 502 controlling whether a formatter 214 is to enable such a retrieval of data.

The initial read procedure 800 utilizes the data throttling mechanism 210, the skip mask 212 and the buffer manager 208 to administer an initial access of a track 306 pursuant to a read command. The initial read procedure 800 is preferably used to recover multiple, errors occurring on a single track 306 of the disc drive 100. Accordingly, for operations 802–820 shown in FIG. 8, it is assumed that multiple soft errors are encountered as the disc drive 100 reads data from the disc 108. As such, operations of the initial read procedure 800 are used to correct accessing of the sectors 322 on the disc 108 where a soft error is encountered. Accordingly, for operations 802–820 shown in FIG. 8, it is assumed that the errors encountered are soft, as opposed to hard, errors.

The initial read procedure 800 is initiated in start operation 802 once a read command is received by the disc drive 100 servo system. Once initiated, control passes to advance operation 804. Advance operation 804 positions a target sector 322 directly under the read/write head 118 as the target sector 322 is rotated toward the read/write head 118 by the rotation of the disc 108. The target sector 322 is the first sector of the data segment being accessed pursuant to the read command. Once the target sector is positioned under the read/write head 118 control passes to read operation 806.

Read operation 806 retrieves data stored on the target sector 322 from the disc 108 medium. In particular, as the read/write head 118 is positioned over the target sector 322, the formatter 214 enables data to be read. Since the target sector 322 is the first sector 322 of the data segment being read pursuant to the read command, the entry of the skip mask table 502 associated with the target sector is identified with a "0." While identification with a "0" in the entry of the table 502 enables the formatter 214 to transfer data from a particular sector 322 to the buffer 206, identification with a "1" in the entry of the skip mask table 502 commands the formatter 214 to preclude the retrieval of data from that particular sector 322 as the read/write head 118 accesses the sector 322.

Once data from the target sector 322 is read in read operation 806, control passes to query operation 808. Query operation 808 determines whether a soft error was encountered while reading data from the target sector 322. If it is determined by query operation 808 that a soft error was encountered, control passes to log error operation 810. Log error operation 810 logs the error so that data contained on the target sector 322 may be recovered through a subsequent read error recovery operation, or procedure, 814, as will be discussed below.

Figure 9:
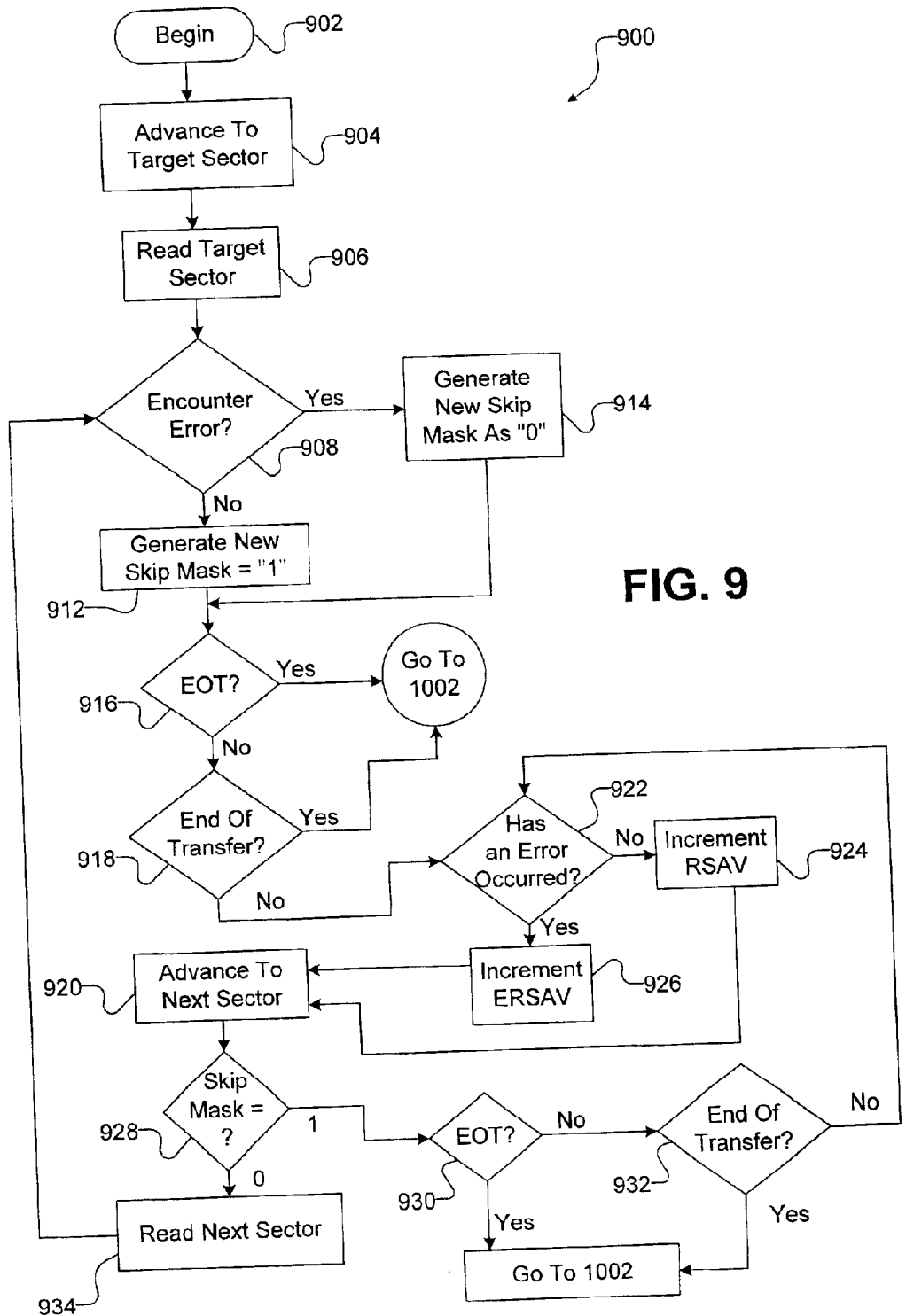
FIG. 9 is a flow diagram that illustrates operational characteristics shown in FIG. 8 in more detail in accordance with an embodiment of the present invention.

Specifically, as shown in more detail in FIG. 9, log error operation 810 updates the skip mask table 502 to reflect that an error was encountered while accessing the sector 322 The log error operation 810 also updates the disc address pointer 414 or the buffer manager such that the data sector on which an error was just encountered will be written to the appropriate sector of the buffer 206. Furthermore, the log error operation updates the data throttling register to reflect that an error has occurred while reading at level one section of the data segment.

Once the soft error is logged, or if there has been no soft error encountered while reading the target sector 322, control passes to query operation 812. Query operation 812 determines whether the read/write head 118 is positioned at the end of the track 306 currently being accessed by the read/write head 118. If the read/write head 118 is positioned at the end of the track, control passes to a read error recovery procedure (such as operation 1000 in FIG. 10). The read error recovery procedure 1000 is initiated by execution operation 814. The read error recovery procedure 1000 re-reads data from the sectors 322 where an error occurred during the initial read operation 800. In particular, the read error recovery procedure 1000 recovers multiple errors on the track 306 currently being accessed during a single revolution of the disc 108. Once the read error recovery procedure 1000 is initiated, control passes to termination operation 820 and the initial read operation 800 is terminated.

If query operation 812 determines that the read/write head 118 is not currently positioned at the end of the track 306, control passes to query operation 816. Query operation 816 determines whether (i) the previous sector 322 read is the last sector 322 in the data segment being read pursuant to the read command, or (ii) the buffer segment 26 to which the data segment is being transferred is full. If either case (i) or (ii) is true, control passes to execution operation 814. However, if the previous sector read is not the end of the data segment and the buffer segment to which the data segment being transferred is not full, control passes to continue operation 818. Continue operation 818 instructs the formatter 214 to read data being stored on the subsequent sector 322 of the track 306 even though a soft error may have occurred while reading a previous sector of the data segment.

Once the formatter 214 has enabled the transfer of data stored on the next sector 322, control passes to query operation 808. Query operation 808, as discussed above, determines whether a soft error was encountered while reading the "next" sector 322. If a soft error has been encountered, control passes to the log error operation 810 and the error is logged as previously discussed. If a soft error was encountered, control passes to query operation 812 where it is determined whether the "next" sector 322 accessed is the last sector 322 on the track 306 that the read/write head is currently accessing. If the "next" sector read is the final sector on the track that the read/write head 118 is currently accessing, control passes to and initiates the read error recovery procedure in execution operation 814. Following execution operation 814, control passes to termination operation 820 as previously discussed.

If, however, the "next" sector 322 just accessed is not the final sector 322 of the track 306 that the read/write head 118 is currently accessing, control passes to query operation 816.

As mentioned, query operation 816 determines whether (i) the "next" sector 322 just read is the last sector 322 of the data segment to be read pursuant to the read command, or (ii) whether the buffer segment 206 to which the data segment is being transferred is full. If either (i) or (ii) is true, the read error recovery procedure is initiated by execution operation 814. However, if both cases (i) and (ii) are false, control then passes again to continue operation 818. Continue operation 818 identifies the subsequent sector 322 of the data segment being read as the "next" sector 322. From continuation operation 818 control continues as previously described.

Figure 10:
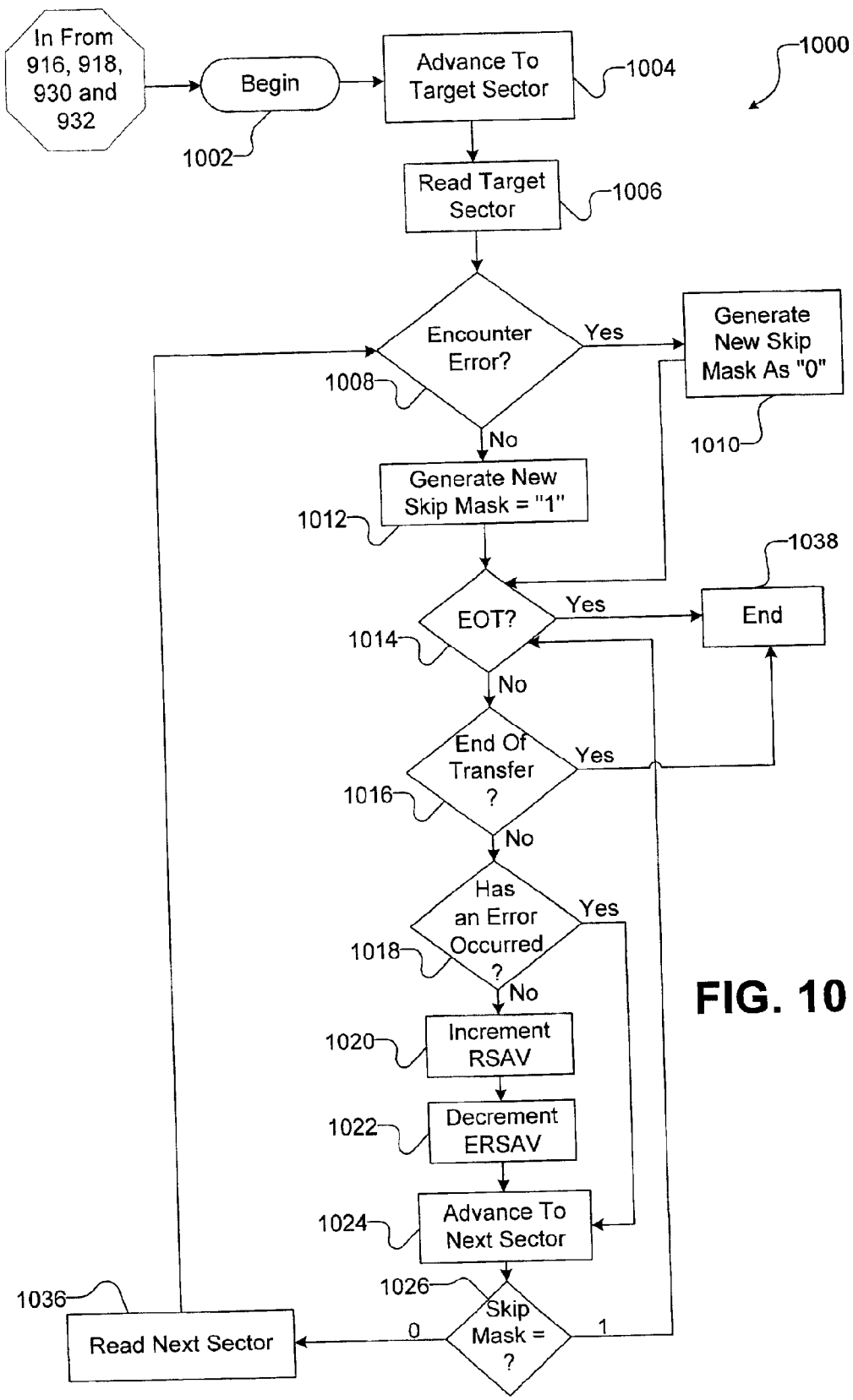
FIG. 10 is a flow diagram that illustrates operational characteristics of a read error recovery procedure administered on the data segment initially accessed in FIG. 8 in accordance with an embodiment of the invention.

FIG. 9 is a flow diagram illustrating operations associated with reading a data segment from a disc 108 media in accordance with a preferred embodiment of the present invention. In particular, the initial read procedure 900 incorporates aspects of the initial read procedure 800 but more specifically illustrates operations associated with reading a data segment from a disc 108 medium where multiple soft errors are encountered while the segment is being read from a single track 306 on the disc 108. Like the initial read procedure 800 described in FIG. 8, the initial read procedure 900 preferably utilizes a data throttling mechanism 210, a skip mask 212 and a buffer manager 208 to administer an initial access 900 of a track 306 pursuant to a read command. Whereas the initial read procedure 900 describes operations associated with reading data from a disc 108 media and more particularly to logging soft errors encountered while reading data, FIG. 10 illustrates an actual read error recovery procedure 1000 in accordance with a preferred embodiment of the present invention. In fact, initial read procedure 900 and the read error recovery procedure 1000 are related in that operations performed in the initial read procedure 900 log information identifying the particular sectors 322 on which a soft error was encountered and the read error recover procedure 1000 re-reads data from the sectors 322 logged by the initial read procedure 900.

Initial read procedure 900 begins with initiation operation 902. The initial read operation 900 is described in FIG. 9 as being implemented with a read/write head 118 positioned above a disc 108 media and accessing a top surface of the disc 108, as opposed to being positioned below a disc 108 media and accessing a bottom surface of the disc 108. Alternatively, the initial read operation 900 may be used to read data from the bottom surface of a disc 108. In which case, the initial read operation 900 would refer to a sector 322 being accessed as positioned "above" the read/write head 118 while the read/write head 118 is thus positioned "below" the sector 322.

From initiation operation 902, control passes to target sector operation 904 wherein the target sector is positioned below a read/write head 118 as the disc 108 being accessed rotates below the read/write head 118. Once the target sector is positioned directly below the read/write head 118, the data stored on the target sector 322 is retrieved by read operation 906. The data is retrieved by read operation 906 and transferred through the read/write channel 220 to the buffer 206 where it is stored until retrieved by the host computer 200. The formatter 214 enables such a transfer of data from the read/write head 118 to the buffer 206.

Once data stored on the target sector 322 is retrieved by read operation 906, control passes to the query operation 908. Query operation 908 determines whether a soft error was encountered while reading the target sector 322. If a soft error was encountered while reading the target sector 322, control passes to generate operation 914. Generate operation 914 updates the skip mask table 502 (FIG. 11) such that the entry in the skip mask table 502 associated with the sector 322 currently being accessed is identified with a "0." By identifying an entry in the skip mask table 502 with a "0," the formatter 214 is instructed to read data from that sector 322 associated with the entry on the next revolution of the track 306 being accessed. In contrast, if an entry in the skip mask table 502 is updated to a "1," the formatter 214 is instructed to preclude the retrieval of data from the sector 322 as the sector 322 is accessed on a subsequent revolution. Thus, if a soft error occurs on the sector 322 currently being read, the entry in the skip mask table 502 associated with that sector 322is updated to a "0," otherwise the entry is identified with a "1."

If an error was not encountered, as determined by query operation 908, control passes to generate operation 912. Generate operation 912 updates the skip mask table 502 such that the entry in the skip mask table 502 associated with the sector 322 currently being accessed is identified with a "1." In such circumstances, the retrieval of data from a sector 322 identified with a "1" in the skip mask table 502 will be "skipped" and data will not be transferred from that sector 322 on the next revolution of the track 306, i.e. during the error recovery procedure 1000 performed following initial access.

Control passes from generate operations 912 and 914 to query operation 916. Query operation 916 determines whether the previous sector read 322 is the final sector 322 on the track 306. If the previous sector 322 read is the final sector 322 on the track 306, control passes to error recovery procedure 1000, which is discussed below. However, if the previous sector 322 read is not the final sector 322 on the track 306, control passes to query operation 918 and the initial read procedure 900 continues. Query operation 918 determines whether (i) the previous sector 322 read is the last sector 322 of the segment being read pursuantto the read command, or (ii) if the segment of the buffer 206 to which the data segment is being transferred is full. If either (i) or (ii) is true, control passes to error recovery operation 1000 However, if neither (i) or (ii) is true, control passes query operation 922.

Query operation 922 determines whether a soft error has occurred while reading any segment of the current data segment. If a soft error has not occurred, control passes to increment operation 924. Increment operation 924 increments a read sector available (RSAV) register 1104 by one count. The RSAV register 1104 is the register which instructs the host computer 200 that the data stored in a particular sector 322 of the buffer 206 is available for transfer to the host computer 200. "Available" data is data which may be transferred to the host 200 because a soft error was not encountered while reading the data from the sector 322 on the previous revolution of the track 306. If an error has occurred while reading this sector 322, control passes to increment operation 926. Increment operation 926 increments the error sector available (ERSAV) register 1102 by one count. During the initial read procedure 900, the ERSAV register 1102 is a register that specifies that a soft error occurred while reading a particular sector 322. The ERSAV register 1102 is incremented one count for each sector 322 accessed following detection of a soft error. The RSAV register 1104 and the ERSAV register 1102 may be referred to as data throttling registers.

Following increment operations 924 and 926, control passes to advance operation 920. Advance operation 920 advances the "next" sector 322 of the data segment being read directly under the read/write head 118. Once the "next" sector is advanced under the read/write head 118, control passes to query operation 928 where it is determined whether or not the entry of the skip mask table 502 associated with the "next" sector 322 is identified with a "0" or "1." If the entry is identified with a "1," query operation 928 passes to query operation 930. Query operation 930 determines whether the sector 322 just accessed by the read/write head 118 is the final sector 322 of the track 306 being read. If it is determined that the sector 322 just accessed is the final sector 322 of the track 306, control passes to error recovery procedure 1000 and error recovery operations are initiated to recover the errors encountered during the initial read procedure 900. If, however, the end of the track 306 is not realized following access of the "next" sector 322 by the read/write head 118, control passes from query operation 930 to query operation 932.

Query operation 932 determines whether or not the sector 322 that is advanced directly under the read/write head 118 is the last sector 322 of the data segment being accessed pursuant to the read command. Furthermore, it is also determined by query operation 932 whether the buffer segment to which the data segment is being transferred is full. If either (i) the buffer segment is full or (ii) the sector 322 advanced under the read/write head 118 is the last sector 322 of the data segment, control passes to error recovery procedure 1000, which initiates error recovery operations to recover the soft errors encountered while reading the data segment. If, however, both (i) and (ii) are false, control passes to query operation 922 and continues as previously discusses.

As mentioned, once control reaches query operation 928 following operations 922, 924, 926 and 920, it is determined whether the skip mask table 502 entry for the "next" sector 322 is identified with a "0" or "1." If the skip mask table 502 entry is identified with a "0," thereby specifying that the data stored on this "next" sector 322 is to be read from the disc 108, control passes to read operation 934 where the data stored on the sector 322 is retrieved. Control then passes to query operation 908 and continues as previously described. If the skip mask table 502 entry is a "1," thereby specifying the data stored on this "next" sector 322 is not to be retrieved from the disc 108, control passes to query operation 930 and continues as previously discussed.

FIG. 10 illustrates operations of a read error recovery procedure 1000 used in accessing a disc 108 subsequent to the initial access procedure 900 shown in FIG. 9. In particular, operations 1002–1038 illustrate operations incorporated in a re-read of data from multiple sectors 322 on a single track 306 where soft errors were encountered during the initial read procedure 900. Like the initial read procedures described in FIGS. 8 and 9, the read error recover procedure 1000 preferably utilizes the data throttling mechanism 210, the skip mask 212 and the buffer manager 208 to administer re-reads of a track 306 on which multiple errors were encountered during an earlier access. The read error recovery procedure 1000 is initiated in start operation 1002. From start operation 1002, control passes to advance operation 1004. In advance operation 1004, the target sector 322, which is the first sector 322 to be re-read in the subsequent access, is positioned under the read/write head 118 as the disc 108 is rotated under the read/write head 118.

Once the target sector 322 is positioned directly below the read/write head 118, control passes to read operation 1006. Read operation 1006 retrieves data stored on the target sector 322 and transfers the data into the buffer 206 via the read/write channel 220. The retrieval of data from the target sector 322 is enabled by the formatter 214 when the disc 108 is rotated such that the target sector 322 is positioned directly below the read/write head 118. Up to the point in time when the target sector 322 is positioned directly under the read/write head 118, the formatter 214 precludes retrieval of data from earlier accessed sectors 322 on the rotating disc 108.

Once data from the target sector 322 is retrieved in read operation 1006, control passes to query operation 1008. Query operation 1008 determines whether a soft error was encountered while retrieving data stored on the target sector 322 during the read error recovery procedure 1000. If a soft error was encountered while re-reading data stored on the target sector 322, control passes to generate operation 1010. Generate operation 1010 updates the entry of the skip mask table 502 (FIG. 11) associated with the sector currently being accessed (i.e., the target sector 322 in operation 1006) so that the sector 322 is identified with an "0," thereby instructing the formatter 214 to re-read data from that sector 322 on the next revolution of the track 306 currently being accessed pursuant to the received read command. If, however, query operation 1008 determines that an error was not encountered during the re-read of the target sector 322, control passes to generate operations 1012. Generate operation 1012 updates the entry of the skip mask table 502 associated with the sector 322 currently being accessed (i.e., the target sector 322 in operation 1006) so that the sector 322 is identified with a "1," thereby instructing the formatter 214 that data has properly been retrieved from the sector 322 and therefore, on subsequent revolutions, is not to be read again in conjunction with the current read command.

Once generate operations 1012 and 1010 are completed, control passes to query operation 1014. Query operation 1014 determines whether the read/write head 118 is positioned at the end of the track 306 currently being accessed. If the read/write head 118 is positioned at the end of the track 306, control passes to termination operation 1038 and the first pass of the read error recovery procedure 1000 is completed. If, however, the read/write head 118 is not positioned at the end of the track 306, control passes to query operation 1016

Query operation 1016 determines (i) whether each data sector 322 of the data segment being read has been accessed by the read/write head 118, and (ii) whether the buffer segment to which the data segment is being transferred is full. With regard to condition (ii), a sector 322 is accessed if the sector 322 passes under the read/write head 118 and servo information is read even though the formatter 214 may not enable the retrieval of data from the sector 322 on the disc 108 media. Thus, if the read/write head 118 during the re-read, or error recovery procedure 1000, has accessed each sector 322 of the data segment, the read/write head 118 has reached the end of the data segment and control passes to termination operation 1038. With regard to condition (ii), if the buffer segment is full, then no more data can be transferred from the disc 108 to the buffer 206 until the host 200 retrieves data currently stored in the buffer 206. Thus, control passes to termination operation 1038.

If it is determined that (i) the previous sector accessed is not the last sector of the data segment, or (ii) the buffer segment to which the data segment is being transferred is not full, control passes to query operation 1018. Query operation 1018 determines whether a soft error has occurred during the current re-read of any sector 322 of the data segment. If an error has occurred during the current re-read, control passes to advance operation 1024. If an error has not occurred during the current re-read, control passes to increment operation 1020 and the RSAV register 1104 is incremented by a one count. Once the RSAV register 1104 is incremented by one count, control passes to decrement operation 1022. Decrement operation 1022 decrements the ERSAV register 1102 by one count. Once the ERSAV register 1102 is decremented by one count, control passes to advance operation 1024.

In advance operation 1024, the "next" sector in ascending order from the target sector is accessed by the read/write head 118. Once the "next" sector is accessed, control passes to query operation 1026. Query operation 1026 determines whether the entry of the skip mask table 502 associated with the "next" sector is identified with a "0" or "1." If the entry of the skip mask table 502 is identified with a "0," control passes to read operation 1036 and data stored on the "next" sector is retrieved by the read/write head 118 and transferred to the buffer 206 via the read/write channel 220. If, however, the entry of the skip mask table 502 associated with the "next" sector is identified with a "1," control passes to query operation 1014 and continues as previously discussed with the condition that the "next" sector is thereafter defined as "current next sector +1" in advance operation 1024.

As mentioned, if the entry of the skip mask table 502 associated with the "next" sector is a "0," then data stored on the "next" sector is retrieved by the read/write head 118 and transferred to the buffer 206 via the read/write channel 220 in read operation 1036. Once the data is read, control passes to query operation 1008 and continues as previously discussed.

If either the query operation 1014 or query operation 1016 result in the affirmative, control passes to termination operation 1038, which is the conclusion of the initial read error recovery procedure 1000. The read error recovery procedure 1000 is then re-initiated at start operation 1002 if, after the first re-read, a soft error barred the transfer of data from at least one sector of the data segment being transferred pursuant to the read command. Specifically, this determination is realized by query operation 1018. Query operation 1018 determines whether a soft error has occurred during the previous access, which in this example would be the initial re-read. If an error has occurred, the read error recovery procedure 1000 is re-initiated at start operation 1002 and the read error recovery procedure 1000 continues as previously described with the target sector 322 being the first sector upon which a soft error was encountered while reading the segment in the previous reread. The error recovery procedure 1000 may then be re-executed as many times as needed to ensure that all data of the data segment is read.

Figure 11:
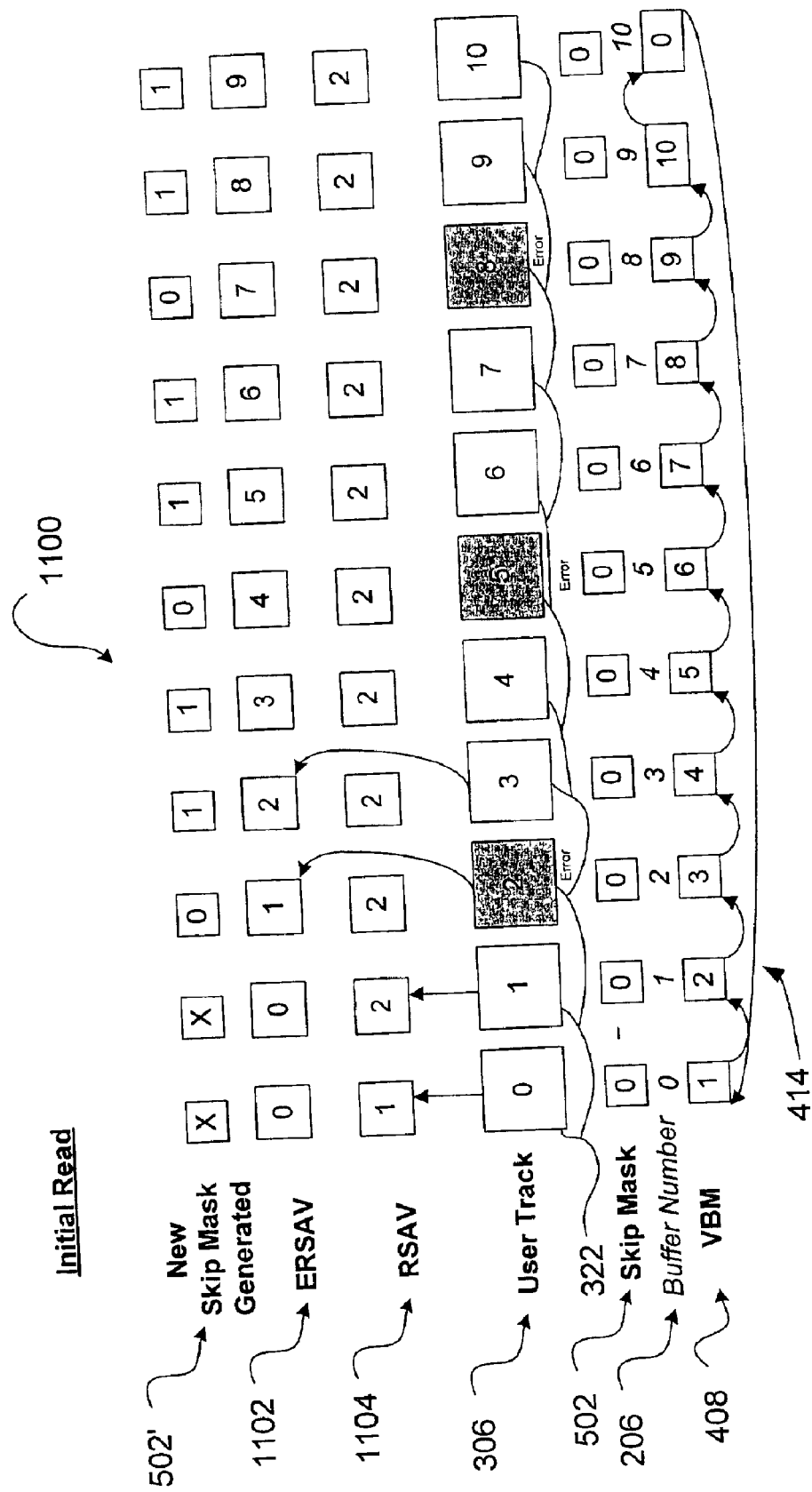
FIG. 11 is a state representation that illustrates states of the data throttling mechanism, the skip mask hardware and the buffer manager of FIG. 2 as the data segment is initially accessed by the initial read procedure of FIG. 8.
Figure 12:
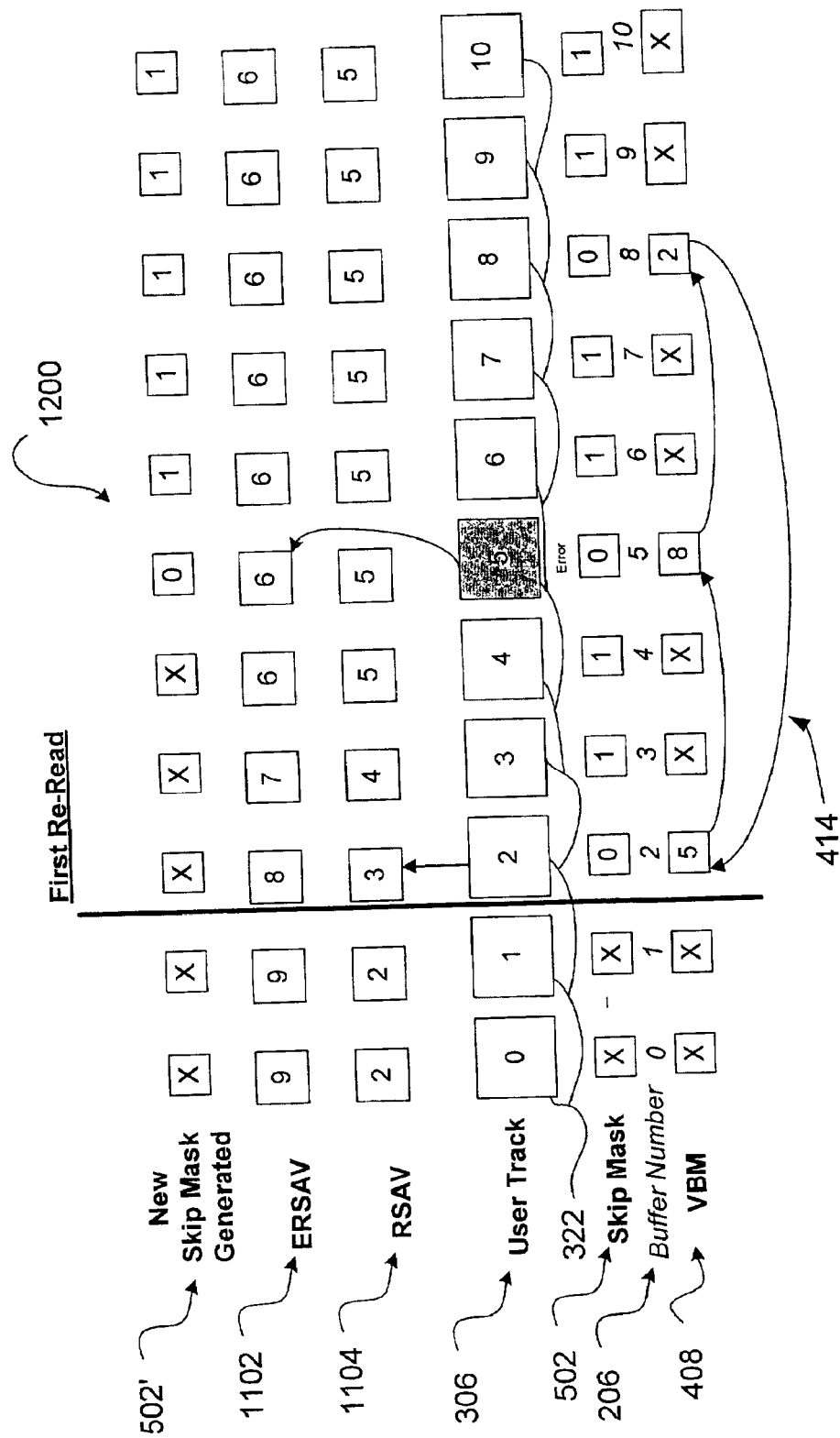
FIG. 12 is a state representation that illustrates states of the data throttling mechanism, the skip mask hardware and the buffer manager of FIG. 2 as the data segment is accessed a first time by the read error recovery procedure of FIG. 10.

FIG. 11 is a state representation of the operations performed by the initial read procedure 900 in accordance with a preferred embodiment of the present invention. The state representation 1100 shows a VBM table 408, a representation of a buffer 206 having eleven sectors 322 numbered "0" through "10," a skip mask table 502 having eleven entries, with each entry corresponding to a data sector 322, a representation of a data segment having eleven sectors 322 on a user track 306 on the disc 108 media, an RSAV register 1104, an ERSAV register 1102, and an updated skip mask table 502 generated as each sector on the data segment is accessed. For clarity, the updated skip mask table 502 is designated with the reference 502' on the state representation 1100, as well the state representations 1200 (FIG. 12) and 1300 (FIG. 13), in order to distinguish the updated table 502' generated following sector 322 access from the table 502 used prior to sector 322 access.

The components of the state representation 1100 are interrelated based on the operations performed in the initial read procedures 800 and 900. Referring to the state representation 1100, as a read/write head 118 first accesses sector 322 zero of the data segment, a soft error is not encountered; thus, sector 322 zero of the data segment is not shown shaded. The skip mask entry of the skip mask table 502 is identified with a "0" thereby instructing the formatter 214 to retrieve data stored on sector 322 zero of the data segment and transfer that data to the buffer 206. Upon transfer of data from sector 322 zero to the buffer 206, the RSAV register 1104 is incremented by a one count. The ERSAV register 1102 will remain at a count of "0" since a soft error has not yet been encountered on the data segment as the read/write head 118 accesses the track 306.

The entry of the skip mask table 502 associated with sector zero of the data segment updated to "1" because a soft error was not encountered. As mentioned earlier, by being identified with a "1," the entry of the skip mask table 502 associated with sector 322 zero will instruct the formatter 214 that the data stored on sector 322 zero of the data segment should not be retrieved on the next revolution of the disc 108 as the disc 108 is accessed by the read/write head 118.

Upon retrieval, the data from sector 322 zero of the data segment is transferred to buffer 206 sector zero. Upon transfer of the data to the appropriate buffer 206 sector, the VBM table 408 dictates which sector of the buffer 206 is to receive data stored on the next sector 322 from which data is to be transferred. Accordingly, at buffer 206 sector zero, the disc address pointer 414 commands the disc drive 100 to transfer the next data sector 322 to sector one of the buffer 206 when the read/write head 118 accesses the sector 322. Accordingly, the read/write head 118 will next access and read data from sector 322 one of the data segment because the entry of the skip mask table 502 associated with sector 322 one is "0." By identifying a particular sector 322 with a "0," as opposed to a "1," the formatter 214 is instructed to enable the read/write head 118 to transfer data read from the buffer 206 sector corresponding to the sector 322 on the disc 108 media. The RSAV register 1104 is incremented by one count. The ERSAV register 1102 remains at zero because a soft error has not yet been encountered. The entry of the skip mask table 502 associated with sector 322 one of the data segment will be set to "1" thereby instructing the formatter 214 that data is not to be transferred from sector 322 one on the next revolution of the disc 108 underneath the read/write head 118. Again, data is transferred to sector one of the buffer 206 because the disc address pointer 414 identifies buffer 206 sector one as the next buffer 206 sector to which data is to be written from the disc 108 as it enters the buffer 206.

Once data is received by the buffer 206, the read/write head 118 next accesses sector 322 two of the data segment. As shown by the shaded regions of FIG. 2 a soft error is encountered while reading sector 322 two of the data segment. Because a soft error was encountered while attempting to read sector 322 two of the data segment, the RSAV register 1104 will not be incremented by one for any subsequently accessed sector 322 of the data segment. In contrast, the ERSAV register 1102 is incremented by one and will be incremented by one for each subsequently accessed sector 322 read following the first soft error, which, in this example, is at sector 322 two of the data segment. Furthermore, since a soft error was encountered at sector 322 two, the entry of the skip mask table 502 associated with sector 322 two of the data segment is identified with a "0," thereby instructing the formatter 214 to enable the transfer of data between the read/write head 118 and the buffer 306 during the next revolution of the disc 108 accessed by the read/write head 118.

Following access of sector 322 two of the data segment, the read/write head 118 will access sector 322 three because sector 322 three is the next sector 322 of the data segment in ascending order. Because the entry of the skip mask table 502 corresponding to sector 322 three is identified with a "0," the data stored on sector 322 three is retrieved by the read/write head 118 and read through the read/write channel 220 to the buffer 206. Even though a soft error was not encountered while reading sector 322 three, the RSAV register 1104 will not be incremented by one. Hence, the RSAV register 1104, is maintained at a count of "2" for sector 322 three and the remaining sectors 322 of this data segment on the user track 306. In contrast, the ERSAV register 1102, as mentioned earlier, is incremented by one count for each sector 322 of the data segment that is subsequently accessed on the user track 306 regardless of whether a soft error is subsequently encountered on sector 322 three through sector 322 ten.

The entry of the skip mask table 502 associated with sector 322 three is updated to a "1" thereby instructing the formatter 214 to preclude the retrieval of data from sector 322 three on a subsequent revolution of the disc 108 accessed by the read/write head 118. As mentioned, identifying an entry of the skip mask table 502 with a "1" signifies that data stored on that sector 322 was properly retrieved from the disc 108 and a soft error was not encountered while reading the data.

The data stored on sector 322 three of the data segment is transferred to sector 322 three of the buffer 206 based on instructions from the disc address pointer 414 to write data to sector 322 three of the buffer 206 upon the next occurrence of data being transferred. Once data stored on sector 322 three of the data segment is read into the buffer 206, sector 322 four is accessed. Like the previous sectors 322, data stored on sector 322 four is read from the disc 108 and the read/write head 118 next accesses sector 322 five. In this example, since a soft error is encountered while attempting to read sector 322 five of the data segment, the entry for the skip mask table 502 associated with sector 322 five is updated to a "0," thereby instructing the formatter 214 that data from sector 322 five is to be re-read during the next revolution of the disc 108 accessed by the read/write head 118.

As shown in state representation 1100, the ERSAV register 1102 is incremented during the access of any sector 322 of the data segment regardless of whether a soft error is encountered or not. In contrast, the RSAV register 1104 remains static (ie, at a count of "2") for the remainder of the sectors 322 of the data segment being read following occurrence of the soft error. The entry of the skip mask table 502 associated with each subsequent sector 322 that is generated upon reading each sector 322 of the data segment continues to identify sectors 322 by either a "0" or a "1" regardless of whether a soft error was previously encountered. Regardless of whether a soft error has been encountered, the initial read procedure 900 is completed, after sector 322 ten of the data segment has been accessed.

As mentioned with FIGS. 8, 9 and 10, the read/error recovery procedure 1000 is initiated following completion of the initial read procedure. The first read error recovery procedure 1000 is illustrated in a state representation 1200 in FIG. 12. State representation 1200 is a depiction of the state representation 1100 at a later period in time and therefore depicts the same components, i.e., VBM table 408, skip mask table 502, etc. . . . , that the state representation 1100 depicts. Indeed, state representation 1200 is simply a snapshot in time of the initialization of a first read error recovery procedure 1000 in accordance with a preferred embodiment of the present invention.

The target sector 322 in the state representation 1200 is sector 322 two of the data segment because sector 322 two is the first sector 322 on which a soft error was encountered as data was being read from the user track 306 during the initial read procedure 900 illustrated in state representation 1100. Accordingly, the formatter 214 will not enable retrieval of data from an accessed sector 322 until the target sector 322 is accessed by the read/write head 118. As such, the skip mask table 502 for sector 322 zero and sector 322 one are set to "1." Thus, the formatter 214 is instructed to preclude retrieval of data from sectors 322 zero and one. In addition, the RSAV register 1104 and ERSAV register 1102 remain static, ie, in the same count with which the registers 1104 and 1102 were identified upon the conclusion of the initial read procedure at 900. The VBM list 408 is updated so that the disc address pointer 414 creates a circular buffer 206 starting at the target sector 322 and advancing to the next buffer sector 322 where a soft error was encountered. The circular buffer 206 then continues to each subsequent sector 322 upon which a soft error was encountered during the initial read until the disc address pointer 414 points back to the current target sector 322 from the last sector 322 of the buffer list 408 to which data is to be transferred.

Referring to the state representative 1200 illustrating an initial read error recovery procedure 1000, the read/write head 118 retrieves data from sector 322 two of the data segment successfully and the RSAV register 1104 is incremented by one count. Substantially simultaneously, the ERSAV register 1102 is decremented by one count because sector 322 two of the data segment was properly read and a soft error was not encountered. The formatter 214 was instructed to transfer data between the read/write head 118 accessing sector 322 two and the buffer 206 because the skip mask table 502 is identified with a "0" for the entry corresponding to sector 322 two.

The entry of the skip mask table 502 corresponding to sector 322 two is identified with a "1" thereby instructing the formatter 214 that data is not to be transferred from sector 322 two to the buffer 206 during the next revolution of the disc 108 accessed by the read/write head 118. The read/write head 118 then accesses sector 322 three and the formatter 214 is instructed not to read data from sector 322 three because the entry of the skip mask table 502 corresponding to sector 322 three is identified with a "1." Likewise, the read/write head 118 then accesses sector 322 four and the formatter 214 is instructed not to retrieve data stored on sector 322 four because the entry of the skip mask table 502 corresponding to sector 322 four is identified with a "1."

The next sector 322 that the read/write head 118 accesses is sector 322 five. Because the entry of the skip mask table 502 corresponding to sector 322 five is identified with a the formatter 214 is instructed to transfer data from sector 322 five to the buffer 206. However, an error is encountered as the read/write head 118 is attempting to read this data from sector 322 five of the data segment. Accordingly, the RSAV register 1104 will not be incremented for sector 322 five or any other sector 322 subsequently accessed by the read/write head 118 pursuant to the current read error recovery procedure 1000. Likewise, the ERSAV register 1102 is neither decremented nor is it incremented to reflect that an error has occurred on sector 322 five or any subsequently accessed sectors 322 pursuant to the current read error recovery procedure 1000. Thus, the ERSAV register 1102 and the RSAV register 1104 are thereafter "static" for the remainder of the first read error recovery procedure 1000.

The disc address pointer 414 next points to sector 322 eight of the buffer 206 thereby instructing the formatter 214 to transfer data to buffer 206 sector 322 eight from the next sector 322 accessed during the current read error recovery procedure 1000 illustrated in state representation 1200. The read/write head 118, after accessing sector 322 five, then accesses sectors 322 six and seven; however, the transfer of data from these sectors 322 is not enabled by the formatter 214 because the skip mask table 502 is identified with a "1."

While accessing sector 322 eight of the data segment during the initial read procedure 900 a soft error was encountered, as shown in the state representation 1100. Thus, the entry of the skip mask table 502 corresponding to sector 322 eight is identified with a "0," thereby instructing the formatter 214 to enable the transfer of data between the read/write head 118 accessing sector 322 eight and the buffer 206. As already mentioned, the RSAV register 1104 and the ERSAV 1102 remain static throughout the remainder of the read error recovery procedure 1000 applied to this data segment currently being read. Once data is read from sector 322 eight into the buffer 206, the entry of the skip mask table 502 corresponding to sector 322 eight is updated to a "0" thereby instructing the formatter 214 to preclude the retrieval of data from sector 322 eight on subsequent accesses by the read/write head 118. The read/write head 118 then accesses sectors 322 nine and ten. Because both sectors 322 were read properly during initial access procedure 900, the skip mask table 502 instructs the formatter 214 to not read data from these sectors 322. The read error recovery procedure 1000 is thereby terminated following the access of sector 322 ten.

Figure 13:
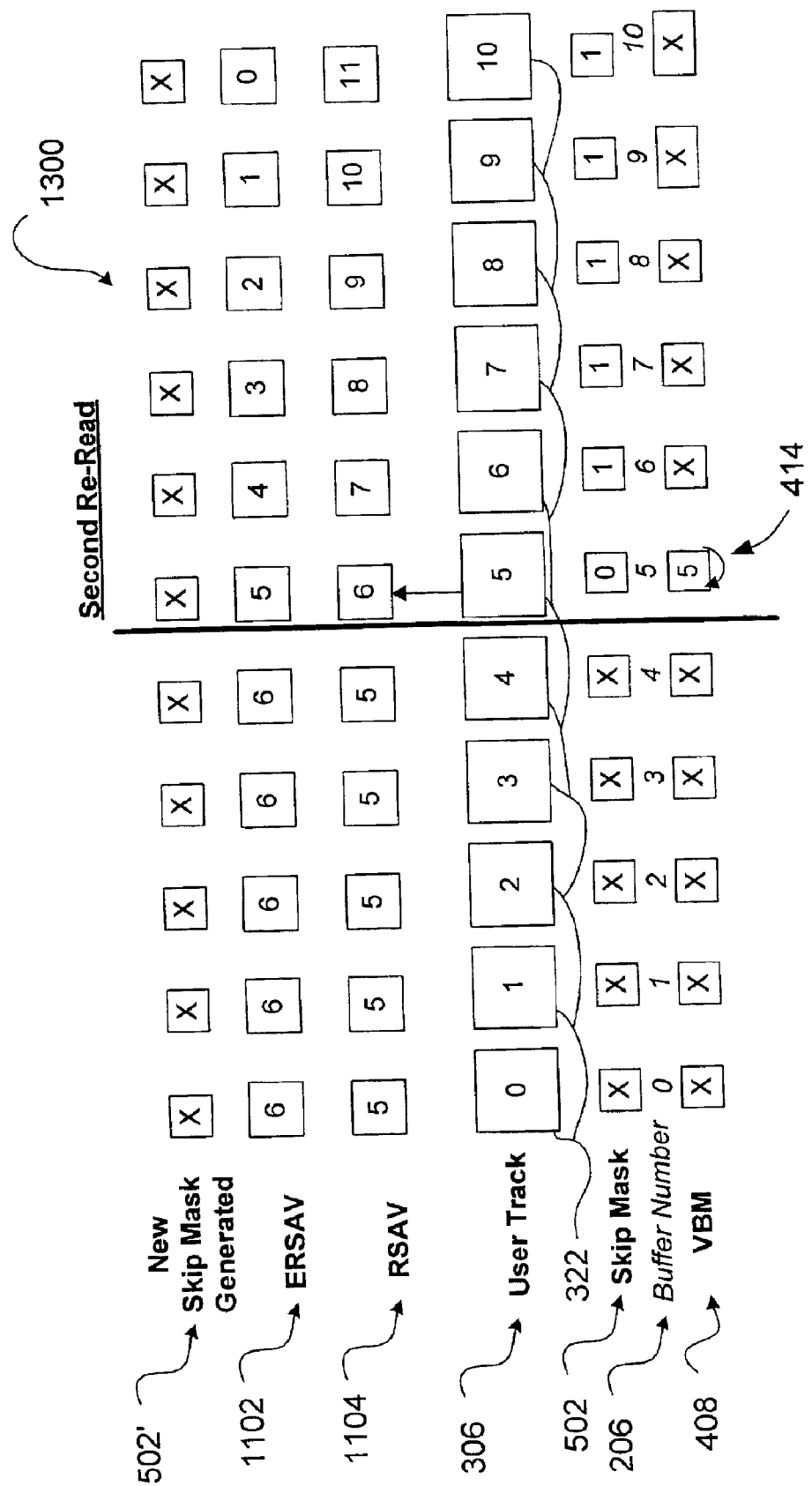
FIG. 13 is a state representation that illustrates states of the data throttling mechanism, the skip mask hardware and the buffer manager of FIG. 2 as the data segment is accessed a second time by the read error recovery procedure of FIG. 10.

FIG. 13 illustrates a subsequent re-read of the read error recovery procedure 1000 wherein the target sector 322 is sector 322 five of the data segment. Sector 322 five is thus the first sector 322 of the data segment in ascending order on which a soft error was encountered during the first error recovery procedure 1000 illustrated in the state representation 1200. Furthermore, since sector 322 five is the only sector 322 of the data segment where a soft error was encountered while performing the previous read error recovery procedure 1000, the VBM table 408 is a circular buffer list with the disc address pointer 414 pointing to the target sector. Once the target sector 322 is accessed by the read/write head 118, data stored on the target sector 322 is retrieved and transferred to buffer 206 sector number five as specified by the disc address pointer 414 The formatter 214 is constructed to enable such a read because the entry of the skip mask table 502 corresponding to sector 322 five is identified with a "0." Once data is read from the user track 306 to the buffer 206, the RSAV register 1104 is incremented by one count and the ERSAV register is decremented by one count to specify that the data is available to be transferred from the buffer 206 to the host 200. Because sector 322 five is the only sector 322 where a soft error occurred, the read/write head 118 will access the remaining sectors 322 (six, seven, eight, nine and ten); however, the read/write head 118 will not read data stored on sectors 322 six, seven, eight, nine and ten because the skip mask table 502 entries for each of these sectors 322 is identified with a "1." Furthermore, for each sector 322 accessed, the RSAV register 1104 is incremented by one count and the ERSAV register 1102 is decremented by one count, because, as shown in FIG. 13, no further soft errors are encountered.

In summary, the present invention may be viewed as a method (such as in operation 800) in a disc drive (such as 100) for accessing a data segment, which may include, without limitation, audio/visual data, on a track (such as 306) wherein multiple errors are encountered as a data segment is accessed by a read/write head (such as 118). The disc drive (such as 100) has a data storage disc (such as 108) including one or more tracks (such as 306) having a plurality of sequentially arranged data sectors (such as 322) accessed by the read/write head (such as 118). The method (such as in operation 800) includes accessing (such as in operation 804) a target sector (such as 322) of the data segment and reading data stored on the sector (such as 322) via the read/write head (such as 118), accessing (such as in operation 818) each additional sector (such as 322) of the data segment in ascending order from the target sector (such as 322) and reading data stored on each additional sector (such as 322) via the read/write head (such as 118), generating (such as in operation 814) an instruction list (such as 502) such that the instruction list (such as 502) identifies each sector (such as 322) of the data segment on which an error is encountered, and executing (such as in operation 814) a read error recovery procedure (such as 100) enabling data from each sector (such as 322) on which an error was encountered to be accessed during a single revolution of the disc (such as 108) as the disc (such as 108) is accessed by the read/write head (such as 118).

In accordance with an embodiment, the executing act (such as in operation 814) includes accessing (such as in operation 1004) a recovery target sector (such as 322) and reading (such as in operation 1006) data stored on the recovery target sector (such as 322) via the read/write head (such as 118). The recovery target sector (such as 322) is the sector (such as 322) of the data segment on which an error was first encountered during the access (such as in operation 800) by the read/write head (such as 118). The executing act (such as in operation 814) also includes, during the read error recovery procedure (such as in operation 1000), accessing (such as in operation 1024) one or more remaining sectors (such as 322) of the data segment on which an error was encountered during the access (such as in operation 800) by the read/write head (such as in operation 800). The one or more remaining sectors (such as 322) are identified by the instruction list (such as 502).

In accordance with an embodiment, the disc drive (such as 100) further includes a data buffer (such as 206) having buffer sectors therein and a formatter (such as 214) operatively connected to the data buffer (such as 206) and the read/write head (such as 118). The formatter (such as 214) regulates the transfer of data between data sector (such as 322) on the track (such as 306) and buffer sectors in the buffer (such as 206). The instruction list (such as 502) instructs the formatter (such as 214) to allow the transfer of data between the buffer sectors and the sector (such as 322) on the disc (such as 108) storing the data segment on which an error is encountered during access (such as in operation 800) by the read/write head (such as 118). The instruction list (such as 502) also instructs the formatter (such as 214) not to transfer data between buffer sectors and the sector (such as 322) on the disc (such as 108) storing the data segment on the track (such as 306) on which an error is not encountered during access (such as in operation 800) by the read/write head (such as 118). The disc drive (such as 100) further includes a skip mask (such as 212) operably connected to the formatter (such as 214) and operable to hold the instruction list (such as 502) and a microprocessor (such as 216) and a vector buffer manager list (such as 408) which indicates the order in which the buffer (such as 206) may be accessed.

In accordance with an embodiment, the method (such as in operation 800) includes updating (such as in operation 810) the vector buffer manager list (such as 408) to direct the transfer of data from each sector (such as 322) of the data segment on which an error is encountered to a corresponding sector in the buffer (such as 206) during the read error recovery procedure (such as in operation 1000). Additionally, the executing act (such as in operation 814) further includes updating (such as in operations 912 and 914) the instruction list (such as 502) to identify each sector (such as 322) on which an error is encountered during the single revolution of the disc (such as 118). As such, the method (such as in operation 800) includes, if an error is encountered during the read error recovery procedure (such as in operation 1000), repeating the executing act (such as in operation 814) until each sector (such as 322) of the data segment is read from the disc (such as 118).

In accordance with an embodiment, the disc drive (such as 100) further includes a data throttling mechanism (such as 210) connected between the buffer (such as 206) and a host computer (such as 200). The data throttling mechanism (such as 210) regulates a transfer of data between the buffer (such as 206) and the host computer (such as 200) and includes a data throttling register (such as in operations 1102 and 1104). The method (such as in operation 800) thus further includes incrementing (such as in operation 810) the data throttling register (such as in operations 1102 and 1104) by one count at each sector (such as 322) access during the single revolution if an error has not occurred while the data segment is accessed from a target sector (such as 322). As such, the method (such as in operation 800) further includes enabling the transfer of data stored from the buffer (such as 206) to the host computer (such as 200) if the count of the data throttling register (such as in operations 1102 and 1104) is equal to a non-zero number. Furthermore, the method (such as in operation 800) includes pausing a transfer of data from the buffer (such as 206) to the host computer (such as 200) if the count of the data throttling register (such as in operations 1102 and 1104) is equal to zero.

In accordance with an embodiment of the invention, the accessing act (such as in operation 800) may be terminated as the read/write head (such as 118) accesses a final sector (such as 322) of the data segment. Additionally, the accessing act (such as in operation 800) may be terminated as the read/write head (such as 118) accesses a single revolution of the track (such as 306).

The present invention may also be viewed as a method (such as in operation 800) in a disc drive (such as 100) for reading data of a data segment from a data storage disc (such as 800) in a disc drive (such as 100). The disc drive (such as 100) has a data storage disc (such as 108) including one or more tracks (such as 306) having a plurality of sequentially arranged data sector (such as 322) accessed by a read/write head (such as 118). The method (such as 800) includes performing (such as in operation 800) an initial read of the data segment during a first access of the track (such as 306) wherein a plurality of errors are encountered on a plurality of sectors (such as 322) of the data segment as the data segment is being initially read and performing (such as in operation 1000) a re-read of the data segment on a subsequent access of the track (such as 306) such that each sector (such as 322) on which an error was encountered is accessed during a single revolution of the disc (such as 108). Furthermore, the method (such as in operation 800) includes, if one or more errors are encountered during the re-read (such as in operation 1000), repeating the performing act (such as in operation 800) on the one or more sectors (such as 322) of the data segment until data from each of the one or more sectors (such as 322) is properly read from the disc (such as 118).

In accordance with an embodiment, the performing act (such as in operation 800) may include accessing (such as in operation 804) a target sector (such as 322) of the data segment and reading data stored on the sector (such as 322) via the read/write head (such as 118), accessing (such as in operation 818) each additional sector (such as 322) of the data segment in ascending order from the target sector (such as 322) and reading data stored on each additional sector (such as 322) via the read/write head (such as 118), and generating (such as in operation 814) an instruction list (such as 502) such that the instruction list (such as 502) identifies each sector (such as 322) of the data segment on which an error is encountered.

In accordance with an embodiment, the performing act (such as in operation 1000) may include includes accessing (such as in operation 1004) a recovery target sector (such as 322) and reading (such as in operation 1006) data stored on the recovery target sector (such as 322) via the read/write head (such as 118). The recovery target sector (such as 322) is the sector (such as 322) of the data segment on which an error was first encountered during the access (such as in operation 800) by the read/write head (such as 118). The executing act (such as in operation 814) also includes, during the read error recovery procedure (such as 1000), accessing (such as in operation 1024) one or more remaining sectors (such as 322) of the data segment on which an error was encountered during the access (such as 800) by the read/write head (such as 800). The one or more remaining sectors (such as 322) are identified by the instruction list (such as 502).

The disc drive preferably further includes a data buffer (such as 206) having buffer sectors therein and a formatter (such as 214) operatively connected to the data buffer (such as 206) and the read/write head (such as 118). The formatter (such as 214) regulates the transfer of data between data sector (such as 322) on the track (such as 306) and buffer sectors in the buffer (such as 206). The instruction list (such as 502) instructs the formatter (such as 214) to allow the transfer of data between the buffer sectors and the sector (such as 322) on the disc (such as 108) storing the data segment on which an error is encountered during access (such as in operation 800) by the read/write head (such as 118). The instruction list (such as 502) also instructs the formatter (such as 214) not to transfer data between buffer sectors and the sector (such as 322) on the disc (such as 108) storing the data segment on the track (such as 306) on which an error is not encountered during access (such as in operation 800) by the read/write head (such as 118). The disc drive (such as 100) further includes a skip mask (such as 212) operably connected to the formatter (such as 214) and operable to hold the instruction list (such as 502) and a microprocessor (such as 216) and a vector buffer manager list (such as 408) which indicates the order in which the buffer (such as 206) may be accessed.

Although the invention has been described and illustrated with a certain degree of particularity, it is understood that the present disclosure has been made only by way of example, and that numerous changes, combinations, and arrangements of techniques can be resorted to by those skilled in the art without departing from the spirit and scope of the invention as claimed below. For example, in a case where the segment of the buffer to which data is being transferred is smaller than the size of the track on which the data is committed, a hardware register is used to denote the specific sector on the track that stores the final block (512 bytes) of data of the buffer segment. The hardware register ensures that the pre-fetch data, which is data requested by the host, is not overwritten. Accordingly, once the target sector references the final segment sector register, the next target sector is loaded to reference the first pre-fetch target sector.

What is claimed is:

1. A method for reading a data segment recorded on a track on a data storage disc in a disc drive, the disc comprising a track circumferentially divided into a plurality of sequentially arranged data sectors accessible by a read/write head and storing the data segment, the method comprising steps of:

(a) accessing, via the read/write head, the plurality of sequentially arranged data sectors and attempting to read data stored on each of the plurality of sequentially arranged data sectors as each sector is being accessed;

(b) in response to encountering at least two errors while attempting to read at least two of the plurality of sequentially arranged data sectors, generating an instruction list identifying the at least two sectors on which the errors were encountered; and (c) executing a read error recovery procedure for reading data from the at least two sectors on which the errors were encountered, wherein the read error recovery procedure accesses and attempts to read data from the at least two sectors identified on the instruction list.

2. A method as defined in claim 1, wherein the executing step (c) comprises steps of:

(c)(i) accessing a recovery target sector and reading data stored on the recovery target sector via the read/write head, the recovery target sector being the sector on which an error was first encountered during performance of the accessing step (a); and (c)(ii) accessing one or more remaining sectors on which an error was encountered during performance of the accessing step (a).

3. A method as defined in claim 2, wherein the disc drive further includes a data buffer having buffer sectors therein and a formatter operatively connected to the data buffer and the read/write head, the formatter being operable for regulating a transfer of data between data sectors on the track and buffer sectors in the buffer, wherein the instruction list is operable for instructing the formatter to allow the transfer of data between the buffer sectors and the at least two sectors on which the errors were encountered during performance of the accessing step (a) and for instructing the formatter not to transfer data between buffer sectors and the sectors on the disc storing the data segment on the track on which an error was not encountered during performance of the accessing step (a).

4. A method as defined in claim 3, wherein the disc drive further includes a skip mask operably connected to the formatter and operable to hold the instruction list.

5. A method as defined in claim 4, wherein the disc drive further includes a microprocessor and a vector buffer manager list which indicates an order in which the buffer may be accessed.

6. A method as defined in claim 5 further comprising a step of:

(d) updating the vector buffer manager list to direct the transfer of data from the at least two sectors on which the errors were encountered to corresponding sectors in the buffer during the read error recovery procedure.

7. A method as defined in claim 2, wherein the executing step (c) further comprises a step of:

(c)(iii) updating the instruction list to identify each sectors on which an error is encountered during the read error recovery procedure.

8. A method as defined in claim 7 further comprising a step of:

(d) if an error is encountered during the read error recovery procedure, repeating the executing step (c).

9. A method as defined in claim 3, wherein the disc drive further includes a data throttling mechanism operably connected between the buffer and a host computer, the data throttling mechanism being operable to regulate a transfer of data between the buffer and the host computer and having a data throttling register, the method further comprising a step of:

(d) incrementing the data throttling register by one count after each sector accessed during the read error recovery procedure if an error is not encountered while the at least two sectors are being accessed.

10. A method as defined in claim 9 further comprising a step of:

(e) enabling the transfer of data stored in the buffer to the host computer if the count of the data throttling register is equal to a non-zero number.

11. A method as defined in claim 9 further comprising a step of:

(e) pausing the transfer of data from the buffer to the host computer if the count of the data throttling register is equal to zero.

12. A method as defined in claim 1, wherein the accessing step (b) is terminated when the read/write head accesses all sectors storing all data of the data segment.

13. A method as defined in claim 1, wherein the accessing step (b) is terminated after the read/write head accesses each of the plurality of sequentially arranged sectors during a single revolution of the track.

14. A method as defined in claim 1, wherein the data segment includes audio/visual data.

15. In a disc drive having a data storage disc radially divided into one or more tracks, wherein each track is circumferentially divided into a plurality of sequentially arranged data sectors accessible by a read/write head, a method for reading a data segment stored on the disc, the method comprising steps of:

(a) performing an initial read of the data segment during a first access of the track wherein a plurality of errors are encountered while accessing at least two sectors on which the data segment is stored; and (b) during a second access of the track subsequent to the first access, re-accessing each of the at least two sectors on which the plurality of errors were encountered in order to attempt a subsequent read of the data recorded thereon, wherein each of the at least two sectors are re-accessed during a single revolution of the disc.

16. A method as defined in claim 15 wherein the performing step (a) comprises:

(a)(i) accessing via the read/write head the plurality of sequentially arranged data sectors and attempting to read data stored on each of the plurality of sequentially arranged data sectors as each sector is being accessed; and (a)(ii) in response to encountering the plurality of errors, generating an instruction list identifying the at least two sectors on which the errors were encountered.

17. A method as defined in claim 16, wherein the re-accessing step (b) comprises:

(b)(i) accessing a recovery target sector and reading data stored on the recovery target sector via the read/write head, the recovery target sector being identified by the instruction list as the sector on which an error was first encountered during the first access by the read/write head; and (b)(ii) during the second access of the track, accessing one or more remaining sectors on which an error was encountered during the first access by the read/write head, the one or more remaining sectors being identified by the instruction list.

18. A method as defined in claim 17, wherein the disc drive further includes a data buffer having buffer sectors therein and a formatter operatively connected to the data buffer and the read/write head, the formatter being operable for regulating a transfer of data between data sectors on the track and buffer sectors in the buffer, wherein the instruction list is operable for instructing the formatter to allow the transfer of data between the buffer sectors and the at least two sectors on which the errors were encountered during the first and the second access of the track and for instructing the formatter not to transfer data between buffer sectors and the sectors on the disc storing the data segment on the track on which an error was not encountered during the first and the second access of the track.

19. A method as defined in claim 18, wherein the disc drive further includes a skip mask operably connected to the formatter and operable to hold the instruction list, a microprocessor and a vector buffer manager list which indicates the order in which the buffer may be accessed.

20. A method as defined in claim 15 further comprising a step of:
(c) if one or more errors are encountered during the subsequent read, repeating the performing step (b) until data from each of the at least two sectors on which an error was encountered during the performing step (a) is properly read from the disc.

21. A system for re-reading data sectors of a data segment recorded on a track on a data storage disc, the system comprising:
a formatter regulating a transfer of data between data sectors on the track accessed by a transducer and buffer sectors in a buffer;
control means for identifying each sector of the data segment to be read by the transducer, the control means identifying the sectors on which an error was encountered during a previous access of the track; and a data throttling mechanism operably connected between the buffer and a host computer, the data throttling mechanism being operable to regulate a transfer of data between the buffer and the host computer.

22. A system as defined in claim 21, wherein the control means comprises:
a skip mask operably connected to the formatter and operable to hold an instruction list, the instruction list being operable for instructing the formatter to allow the transfer of data between the buffer sectors and the sectors on the disc storing the data segment on which an error is encountered during the first and the subsequent access of the track and for instructing the formatter not to transfer data between buffer sectors and the sectors on the disc storing the data segment on the track on which an error is not encountered during the first and the subsequent access of the track.

23. A system as defined in claim 22 further comprising:
a vector buffer manager list indicating an order in which the buffer may be accessed.

24. A system as defined in claim 21, wherein the data segment includes audio/visual data.

25. A disc drive having a data storage disc, an actuator for positioning a transducer over the data storage disc and a disc controller for communicating with a host computer, controlling position of the actuator and controlling access to sequentially arranged data sectors on tracks on the data storage disc, the disc drive comprising:
a buffer having sequentially arranged buffer sectors;
a read/write channel receiving data retrieved from the disc by the transducer;
an interface between the read/write channel and the buffer, the interface transmitting data read through the read/write channel to the buffer sectors of the buffer;
a formatter between the interface and the read/write channel for timing when data is transferred between the interface and the read/write channel;
a buffer manager building and updating a vector buffer manager list which indicates an order in which the buffer may be accessed;
a skip mask mechanism operably connected to the formatter providing an instruction list directing the formatter whether to enable a passage of data between the interface and the read/write channel for each sequentially accessed sector on a data segment being read pursuant to a read command from the host computer; and
a data throttling mechanism operably connected between the buffer and the host computer, the data throttling mechanism being operable to regulate a transfer of data between the buffer and the host computer.

26. A disc drive as defined in claim 25 wherein the data throttling mechanism comprises a data throttling register, the data throttling mechanism enabling the transfer of data from the buffer to the host computer if a count of the data throttling register is equal to a non-zero number.

27. A disc drive as defined in claim 25 wherein the data throttling mechanism comprises a data throttling register, the data throttling mechanism pausing the transfer of data from the buffer to the host computer if the count of the data throttling register is equal to zero.

28. A disc drive as defined in claim 25 wherein the skip mask mechanism controls a read error recovery procedure re-reading data stored on one or more disc sectors as the transducer accesses the data segment during a single revolution of the disc following an initial access of the data segment during which an error was encountered on the one or more disc sectors.

29. A method of reading data stored on a revolving media in a data storage device to provide requested data to a host, the method comprising:
(a) on a first read attempt performed in response to a request from the host to read at least three sequential sectors of data in at least one track on the media, reading all of the sectors of data requested by the host;
(b) storing the data read from each of the sequential sectors into a corresponding number of sequential buffers;
(c) identifying which, if any, buffers in the sequence of buffers contain data with at least one read error; and
(d) if at least one buffer in the sequence of buffers contains data with at least one read error, and if the first and the last buffers in the sequence of buffers both contain data with no read errors, then, on a subsequent read attempt performed in response to the request from the host, reading only those sectors of data corresponding to buffers that were identified as containing data with at least one read error.

30. The method of claim 29, wherein the second read attempt performed in response to the request from the host is initiated within one complete revolution of the media after the first read attempt is completed.

31. The method of claim 29, further comprising, on a subsequent read attempt performed in response to the request from the host, and for each buffer that was identified as containing data with at least one read error on the previous read attempt, storing the read data for the current read attempt into the corresponding buffer.

32. The method of claim 29, further comprising:

on each subsequent read attempt preformed in response to the request from the host, reading only those sectors of data corresponding to buffers that were identified as containing data with at least one read error on the previous read attempt; and storing the data that is read from each of the sectors on the current read attempt into their corresponding sequential buffers;

identifying which, if any, buffers in the sequence of buffers contain data with at least one read error.

33. The method of claim 32, wherein subsequent read attempts are made until no buffers in the sequence of buffers are identified as containing data with read errors.

34. The method of claim 29, wherein the host's access to the data stored in the sequence of buffers is restricted by making available to the host only the data stored in those buffers in the sequence of buffers that are between the first buffer in the sequence and the lowest number buffer in the sequence of buffers that has been identified as containing data with at least one read error for the most recent read attempt.

35. An apparatus for reading data, the apparatus comprising:

a data storage medium;

a controller configured to perform operations to read data stored on the data storage medium in response to a request from a host, the operations comprising:

(a) on a first read attempt performed in response to a request from the host to read at least three sequential sectors of data in at least one track on the media, reading all of the sectors of data requested by the host;

(b) storing the data read from each of the sequential sectors into a corresponding number of sequential buffers;

(c) identifying which, if any, buffers in the sequence of buffers contain data with at least one read error; and (d) if at least one buffer in the sequence of buffers contains data with at least one read error, and if the first and the last buffers in the sequence of buffers both contain data with no read errors, then, on a subsequent read attempt performed in response to the request from the host, reading only those sectors of data corresponding to buffers that were identified as containing data with at least one read error.

36. The apparatus of claim 35, wherein the second read attempt performed in response to the request from the host is initiated within one complete revolution of the media after the first read attempt is completed.

37. The apparatus of claim 35, further comprising, on a subsequent read attempt performed in response to the request from the host, and for each buffer that was identified as containing data with at least one read error on the previous read attempt, storing the read data for the current read attempt into the corresponding buffer.

38. The apparatus of claim 35, further comprising:

on each subsequent read attempt performed in response to the request from the host, reading only those sectors of data corresponding to buffers that were identified as containing data with at least one read error on the previous read attempt; and storing the data that is read from each of the sectors on the current read attempt into their corresponding sequential buffers;

identifying which, if any, buffers in the sequence of buffers contain data with at least one read error.

39. The apparatus of claim 38, wherein subsequent read attempts are made until no buffers in the sequence of buffers are identified as containing data with read errors.

40. The apparatus of claim 35, wherein the host's access to the data stored in the sequence of buffers is restricted by making available to the host only the data stored in those buffers in the sequence of buffers that are between the first buffer in the sequence and the lowest number buffer in the sequence of buffers that has been identified as containing data with at least one read error for the most recent read attempt.

41. A data storage device comprising the apparatus of claim 35.

* * * * *

UNITED STATES PATENT AND TRADEMARK OFFICE
CERTIFICATE OF CORRECTION

PATENT NO. : 6,862,151 B2
DATED : March 1, 2005
INVENTOR(S) : Edward S. Hoskins, Robert W. Warren and Steven S. Williams It is certified that error appears in the above-identified patent and that said Letters Patent is hereby corrected as shown below:

Column 8,
Line 41, insert a period after "108".

Column 12,
Line 6, insert a period after the numbers "322".
Line 37, "26" should read -- 206 --.

Column 20,
Line 53, after "a", insert -- 0 --.

Column 21,
Line 46, insert a period aftre "414".

Column 26,
Lines 27 and 30, "(b)" should read -- (a) --.

Signed and Sealed this

Fourteenth Day of March, 2006

JON W. DUDAS
*Director of the United States Patent and Trademark Office*